US012707488B2

(12) United States Patent
Rossbach et al.

(10) Patent No.: US 12,707,488 B2

(45) Date of Patent: Aug. 11, 2026

(54) RESOURCE ALLOCATION FOR VARIABLE-SIZE DATA BURSTS

(71) Applicant: APPLE INC., Cupertino, CA (US)

(72) Inventors: Ralf Rossbach, Neubiberg (DE); Alexander Sirotkin, Herzliya (IL); Dawei Zhang, Cupertino, CA (US); Fangli Xu, Beijing (CN); Haijing Hu, Cupertino, CA (US); Naveen Kumar R. Palle Venkata, San Diego, CA (US); Pavan Nuggehalli, Cupertino, CA (US); Sarma V. Vangala, Cupertino, CA (US); Sethuraman Gurumoorthy, Cupertino, CA (US); Weidong Yang, San Diego, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 882 days.

(21) Appl. No.: 17/966,520

(22) Filed: Oct. 14, 2022

(65) Prior Publication Data

US 2023/0134245 A1 May 4, 2023

Related U.S. Application Data

(60) Provisional application No. 63/274,436, filed on Nov. 1, 2021.

(51) Int. Cl.

| | |
|---|---|
| ***H04W 28/06*** | (2009.01) |
| ***H04L 5/00*** | (2006.01) |
| ***H04W 72/23*** | (2023.01) |
| ***H04W 72/50*** | (2023.01) |

(52) U.S. Cl.

CPC ......... *H04W 72/535* (2023.01); *H04L 5/0082* (2013.01); *H04W 28/06* (2013.01); *H04W 72/23* (2023.01)

(58) Field of Classification Search

CPC ... H04W 72/535; H04W 72/23; H04W 28/06; H04L 5/0082

USPC ........................................................ 370/329

See application file for complete search history.

(56) References Cited

U.S. PATENT DOCUMENTS

2020/0092833 A1 * 3/2020 Agiwal ................ H04W 72/23

OTHER PUBLICATIONS

Anon, "Configured Grant Enhancements for TSC Traffic", Sequans Communications, 3GPP TSG-RAN WG2 Meeting #107bis, R2-1913622, Oct. 14-18, 2019, 5 pages.

Anon, "Discussion on Flexible Periodicities for Configured Grant/SPS", Huawei, HiSilicon, 3GPP TSG-RAN WG2 Meeting 105bis, R2-1904374, Apr. 8-12, 2019, 5 pages.

Anon, "TP on CG Enhancement for IIoT", LG Electronics Inc., 3GPP TSG-RAN WG2 Meeting #105, R2-1902011, Feb. 25-Mar. 1, 2019, 2 pages.

(Continued)

*Primary Examiner* — Christopher R Crompton

(74) *Attorney, Agent, or Firm* — Kilpatrick Townsend & Stockton LLP

(57) ABSTRACT

The present application relates to devices and components including apparatus, systems, and methods for transmission of variable-size data bursts. Applications to uplink data transmissions and applications to downlink data transmissions are described.

20 Claims, 25 Drawing Sheets

(56) References Cited

OTHER PUBLICATIONS

International Patent Application No. PCT/US2022/046875 , "Invitation to Pay Additional Fees and, Where Applicable, Protest Fee", Mar. 6, 2023, 10 pages.
Teniou, Gilles, 3GPP SA4 Vice-Chairman, 5G, 3GPP A Global Initiative, "3GPP achievements on VR & ongoing developments on XR over 5G," Ecosystem & Standards workshop: Immersive Apr. 2019 Media meets 5G, dated Apr. 2019 in 15 pages.
3GPP TR 22.842 V17.2.0, 5G, 3GPP A Global Initiative, "3rd Generation Partnership Project; Technical Specification Group Services and System Aspects; Study on Network Controlled Interactive Services (Release 17)," (Dec. 2019) in 29 pages.
3GPP TR 38.838 V0.0.1, 5G, 3GPP A Global Initiative, "3rd Generation Partnership Project; Technical Specification Group Radio Access Network; Study on XR (Extended Reality) Evaluations for NR; (Release 17)," (Nov. 2020) in 9 pages.
3GPP TSG-RAN WG1, Tdoc R1-2009087, "XR use cases, traffic modelling and performance measure," Ericsson, Meeting #103-e, Agenda Item 8.14.1, e-Meeting, Oct. 26-Nov. 13, 2020 in 9 pages.
RWS-210659, "Summary of RAN Rel-18 Workshop," 5G Advanced, RAN Chair in 16 pages.
S4-210890, revision of S4-210614, "FS_XRTraffic: Permanent document, v0.7.0," Qualcomm Incorporated (Rapporteur)1, 3GPP TSG-SA4 Meeting #114e, e-meeting, May 19-28, 2021, Agenda Item: 10.8 in 128 pages.
3GPP TR 26.928 version 16.1.0 Release 16, Technical Report, 5G; "Extended Reality (XR) in 5G," ETSI TR 126 928 V16.1.0 (Jan. 2021) in 133 pages.
3GPP TS 38.214 version 16.6.0 Release 16, Technical Report, 5G; NR; "Physical layer procedures for data," ETSI TS 138 214 V16.6.0 (Aug. 2021) in 176 pages [cited for sections 5.1.3.2 and 6.1.4.2].
3GPP TS 38.321 version 16.6.0 Release 16, Technical Report, 5G; NR; "Medium Access Control (MAC) protocol specification," ETSI TS 138 321 V16.6.0 (Oct. 2021) in 160 pages.
3GPP TS 38.331 version 16.6.0 Release 16, Technical Report, 5G; NR; "Radio Resource Control (RRC); Protocol specification," ETSI TS 138 331 V16.6.0 (Oct. 2021) in 948 pages [cited for section 6.3.2].
3GPP TR 26.925 V17.0.0 (Sep. 2021), Technical Report, "3rd Generation Partnership Project; Technical Specification Group Services and System Aspects; Typical traffic characteristics of media services on 3GPP networks (Release 17)" in 31 pages.
PCT/US2022/046875, "International Preliminary Report on Patentability", May 16, 2024, 11 pages.
"Knowledge of TSN Traffic Information to gNB", CMCC, 3Generation Partnership Project Technical Specification Group-Radio Access Network Working Group2 #104, R2-1901975, Feb. 25-Mar. 1, 2019, 4 pages.
EP Application No. 22802809.8, "Office Action", Jun. 3, 2026, 7 pages.

* cited by examiner

```
ConfiguredGrantConfig ::=          SEQUENCE {
    frequencyHopping                   ENUMERATED {intraSlot, interSlot}                                    OPTIONAL,   -- Need S
    cg-DMRS-Configuration              DMRS-UplinkConfig,
    mcs-Table                          ENUMERATED {qam256, qam64LowSE}                                      OPTIONAL,   -- Need S
    mcs-TableTransformPrecoder         ENUMERATED {qam256, qam64LowSE}                                      OPTIONAL,   -- Need S
    uci-OnPUSCH                        SetupRelease { CG-UCI-OnPUSCH }                                      OPTIONAL,   -- Need M
    resourceAllocation                 ENUMERATED { resourceAllocationType0, resourceAllocationType1, dynamicSwitch },
    rbg-Size                           ENUMERATED {config2}                                                 OPTIONAL,   -- Need S
    powerControlLoopToUse              ENUMERATED {n0, n1},
    p0-PUSCH-Alpha                     P0-PUSCH-AlphaSetId,
    transformPrecoder                  ENUMERATED {enabled, disabled}                                       OPTIONAL,   -- Need S
    nrofHARQ-Processes                 INTEGER(1..16),
    repK                               ENUMERATED {n1, n2, n4, n8},
    repK-RV                            ENUMERATED {s1-0231, s2-0303, s3-0000}                               OPTIONAL,   -- Need R
    periodicity                        ENUMERATED {
                                               sym2, sym7, sym1x14, sym2x14, sym4x14, sym5x14, sym8x14, sym10x14, sym16x14, sym20x14,
                                               sym32x14, sym40x14, sym64x14, sym80x14, sym128x14, sym160x14, sym256x14, sym320x14, sym512x14,
                                               sym640x14, sym1024x14, sym1280x14, sym2560x14, sym5120x14,
                                               sym6, sym1x12, sym2x12, sym4x12, sym5x12, sym8x12, sym10x12, sym16x12, sym20x12, sym32x12,
                                               sym40x12, sym64x12, sym80x12, sym128x12, sym160x12, sym256x12, sym320x12, sym512x12, sym640x12,
                                               sym1280x12, sym2560x12
    },
    configuredGrantTimer               INTEGER (1..64)                                                      OPTIONAL,   -- Need R
    rrc-ConfiguredUplinkGrant          SEQUENCE {
        timeDomainOffset                   INTEGER (0..5119),
        timeDomainAllocation               INTEGER (0..15),
        frequencyDomainAllocation          BIT STRING (SIZE(18)),
        antennaPort                        INTEGER (0..31),
        dmrs-SeqInitialization             INTEGER (0..1)                                                   OPTIONAL,   -- Need R
        precodingAndNumberOfLayers         INTEGER (0..63),
        srs-ResourceIndicator              INTEGER (0..15)                                                  OPTIONAL,   -- Need R
        mcsAndTBS                          INTEGER (0..31),
        frequencyHoppingOffset             INTEGER (1.. maxNrofPhysicalResourceBlocks-1)                    OPTIONAL,   -- Need R
        pathlossReferenceIndex             INTEGER (0..maxNrofPUSCH-PathlossReferenceRSs-1),
        ...,
        [[
        pusch-RepTypeIndicator-r16         ENUMERATED {pusch-RepTypeA,pusch-RepTypeB}                       OPTIONAL,   -- Need M
        frequencyHoppingPUSCH-RepTypeB-r16 ENUMERATED {interRepetition, interSlot}                          OPTIONAL,   -- Cond RepTypeB
        timeReferenceSFN-r16               ENUMERATED {sfn512}                                              OPTIONAL    -- Need S
        ]]
    }                                                                                                       OPTIONAL,   -- Need R
    ...,
```

Figure 2

```
    ...,
    [[
    cg-RetransmissionTimer-r16          INTEGER (1..64)                                                    OPTIONAL,   -- Need R
    cg-minDFI-Delay-r16                 ENUMERATED
                                                {sym7, sym1x14, sym2x14, sym3x14, sym4x14, sym5x14, sym6x14, sym7x14, sym8x14,
                                                 sym9x14, sym10x14, sym11x14, sym12x14, sym13x14, sym14x14,sym15x14, sym16x14
                                                }                                                  OPTIONAL,   -- Need R
    cg-nrofPUSCH-InSlot-r16             INTEGER (1..7)                                             OPTIONAL,   -- Need R
    cg-nrofSlots-r16                    INTEGER (1..40)                                            OPTIONAL,   -- Need R
    cg-StartingOffsets-r16              CG-StartingOffsets-r16                                     OPTIONAL,   -- Need R
    cg-UCI-Multiplexing-r16             ENUMERATED {enabled}                                       OPTIONAL,   -- Need R
    cg-COT-SharingOffset-r16            INTEGER (1..39)                                            OPTIONAL,   -- Need R
    betaOffsetCG-UCI-r16                INTEGER (0..31)                                           OPTIONAL,   -- Need R
    cg-COT-SharingList-r16              SEQUENCE (SIZE (1..1709)) OF CG-COT-Sharing-r16            OPTIONAL,   -- Need R
    harq-ProcID-Offset-r16              INTEGER (0..15)                                            OPTIONAL,   -- Need M
    harq-ProcID-Offset2-r16             INTEGER (0..15)                                            OPTIONAL,   -- Need M
    configuredGrantConfigIndex-r16      ConfiguredGrantConfigIndex-r16                             OPTIONAL,   -- Cond CG-List
    configuredGrantConfigIndexMAC-r16   ConfiguredGrantConfigIndexMAC-r16                          OPTIONAL,   -- Cond CG-IndexMAC
    periodicityExt-r16                  INTEGER (1..5120)                                          OPTIONAL,   -- Need R
    startingFromRV0-r16                 ENUMERATED {on, off}                                       OPTIONAL,   -- Need R
    phy-PriorityIndex-r16               ENUMERATED {p0, p1}                                        OPTIONAL,   -- Need R
    autonomousTx-r16                    ENUMERATED {enabled}                                       OPTIONAL    -- Cond LCH-BasedPrioritization
    ]]
    ...,
    [[
    periodicityList-r18                 SEQUENCE (SIZE (1..X)) OF periodicity                      OPTIONAL,   -- Need R
    ]]
}
```

Figure 3

```
    ...,
    [[
    cg-RetransmissionTimer-r16          INTEGER (1..64)                                              OPTIONAL,   -- Need R
    cg-minDFI-Delay-r16                 ENUMERATED
                                                {sym7, sym1x14, sym2x14, sym3x14, sym4x14, sym5x14, sym6x14, sym7x14, sym8x14,
                                                 sym9x14, sym10x14, sym11x14, sym12x14, sym13x14, sym14x14,sym15x14, sym16x14
                                                }                                                    OPTIONAL,   -- Need R
    cg-nrofPUSCH-InSlot-r16             INTEGER (1..7)                                               OPTIONAL,   -- Need R
    cg-nrofSlots-r16                    INTEGER (1..40)                                              OPTIONAL,   -- Need R
    cg-StartingOffsets-r16              CG-StartingOffsets-r16                                       OPTIONAL,   -- Need R
    cg-UCI-Multiplexing-r16             ENUMERATED {enabled}                                         OPTIONAL,   -- Need R
    cg-COT-SharingOffset-r16            INTEGER (1..39)                                              OPTIONAL,   -- Need R
    betaOffsetCG-UCI-r16                INTEGER (0..31)                                             OPTIONAL,   -- Need R
    cg-COT-SharingList-r16              SEQUENCE (SIZE (1..1709)) OF CG-COT-Sharing-r16              OPTIONAL,   -- Need R
    harq-ProcID-Offset-r16              INTEGER (0..15)                                              OPTIONAL,   -- Need M
    harq-ProcID-Offset2-r16             INTEGER (0..15)                                              OPTIONAL,   -- Need M
    configuredGrantConfigIndex-r16      ConfiguredGrantConfigIndex-r16                               OPTIONAL,   -- Cond CG-List
    configuredGrantConfigIndexMAC-r16   ConfiguredGrantConfigIndexMAC-r16                            OPTIONAL,   -- Cond CG-IndexMAC
    periodicityExt-r16                  INTEGER (1..5120)                                            OPTIONAL,   -- Need R
    startingFromRV0-r16                 ENUMERATED {on, off}                                         OPTIONAL,   -- Need R
    phy-PriorityIndex-r16               ENUMERATED {p0, p1}                                          OPTIONAL,   -- Need R
    autonomousTx-r16                    ENUMERATED {enabled}                                         OPTIONAL    -- Cond LCH-BasedPrioritization
    ]]
    ...,
    [[
    periodicity-variation-r18           ENUMERATED {pareto, gaussian, ..}                            OPTIONAL,   -- Need R
    ]]
}
```

Figure 5

```
SPS-Config ::=                  SEQUENCE {
    periodicity                     ENUMERATED {ms10, ms20, ms32, ms40, ms64, ms80, ms128, ms160, ms320, ms640,
                                                spare6, spare5, spare4, spare3, spare2, spare1},
    nrofHARQ-Processes              INTEGER (1..8),
    n1PUCCH-AN                      PUCCH-ResourceId                                            OPTIONAL,   -- Need M
    mcs-Table                       ENUMERATED {qam64LowSE}                                     OPTIONAL,   -- Need S
    ...,
    [[
    sps-ConfigIndex-r16             SPS-ConfigIndex-r16                                         OPTIONAL,   -- Cond SPS-List
    harq-ProcID-Offset-r16          INTEGER (0..15)                                             OPTIONAL,   -- Need R
    periodicityExt-r16              INTEGER (1..5120)                                           OPTIONAL,   -- Need R
    harq-CodebookID-r16             INTEGER (1..2)                                              OPTIONAL,   -- Need R
    pdsch-AggregationFactor-r16     ENUMERATED {n1, n2, n4, n8 }                                OPTIONAL    -- Need S
    ]]
    ...,
    [[
    periodicityList-r18             SEQUENCE (SIZE (1..X)) OF periodicity                       OPTIONAL,   -- Need R
    ]]
}
```

Figure 6

```
SPS-Config ::=                  SEQUENCE {
    periodicity                     ENUMERATED {ms10, ms20, ms32, ms40, ms64, ms80, ms128, ms160, ms320, ms640,
                                                spare6, spare5, spare4, spare3, spare2, spare1},
    nrofHARQ-Processes              INTEGER (1..8),
    n1PUCCH-AN                      PUCCH-ResourceId                                          OPTIONAL,   -- Need M
    mcs-Table                       ENUMERATED {qam64LowSE}                                   OPTIONAL,   -- Need S
    ...,
    [[
    sps-ConfigIndex-r16             SPS-ConfigIndex-r16                                       OPTIONAL,   -- Cond SPS-List
    harq-ProcID-Offset-r16          INTEGER (0..15)                                           OPTIONAL,   -- Need R
    periodicityExt-r16              INTEGER (1..5120)                                         OPTIONAL,   -- Need R
    harq-CodebookID-r16             INTEGER (1..2)                                            OPTIONAL,   -- Need R
    pdsch-AggregationFactor-r16     ENUMERATED {n1, n2, n4, n8 }                              OPTIONAL    -- Need S
    ]]
    ...,
    [[
    periodicity-variation-r18       ENUMERATED {pareto, gaussian, .. }                        OPTIONAL,   -- Need R
    ]]
}
```

Figure 7 time

Variable periodicity, same grant size grant size

Figure 10

Figure 11A
Figure 11B
Variable grant size
Fixed Periodicity
time
Variable grant size
Multiple NewTx per group
Fixed Periodicity
time

```
    ...,
    [[
    cg-RetransmissionTimer-r16              INTEGER (1..64)                                                          OPTIONAL,   -- Need R
    cg-minDFI-Delay-r16                     ENUMERATED
                                                    {sym7, sym1x14, sym2x14, sym3x14, sym4x14, sym5x14, sym6x14, sym7x14, sym8x14,
                                                     sym9x14, sym10x14, sym11x14, sym12x14, sym13x14, sym14x14,sym15x14, sym16x14
                                                    }                                                        OPTIONAL,   -- Need R
    cg-nrofPUSCH-InSlot-r16                 INTEGER (1..7)                                                   OPTIONAL,   -- Need R
    cg-nrofSlots-r16                        INTEGER (1..40)                                                  OPTIONAL,   -- Need R
    cg-StartingOffsets-r16                  CG-StartingOffsets-r16                                           OPTIONAL,   -- Need R
    cg-UCI-Multiplexing-r16                 ENUMERATED {enabled}                                             OPTIONAL,   -- Need R
    cg-COT-SharingOffset-r16                INTEGER (1..39)                                                  OPTIONAL,   -- Need R
    betaOffsetCG-UCI-r16                    INTEGER (0..31)                                                 OPTIONAL,   -- Need R
    cg-COT-SharingList-r16                  SEQUENCE (SIZE (1..1709)) OF CG-COT-Sharing-r16                  OPTIONAL,   -- Need R
    harq-ProcID-Offset-r16                  INTEGER (0..15)                                                  OPTIONAL,   -- Need M
    harq-ProcID-Offset2-r16                 INTEGER (0..15)                                                  OPTIONAL,   -- Need M
    configuredGrantConfigIndex-r16          ConfiguredGrantConfigIndex-r16                                   OPTIONAL,   -- Cond CG-List
    configuredGrantConfigIndexMAC-r16       ConfiguredGrantConfigIndexMAC-r16                                OPTIONAL,   -- Cond CG-IndexMAC
    periodicityExt-r16                      INTEGER (1..5120)                                                OPTIONAL,   -- Need R
    startingFromRV0-r16                     ENUMERATED {on, off}                                             OPTIONAL,   -- Need R
    phy-PriorityIndex-r16                   ENUMERATED {p0, p1}                                              OPTIONAL,   -- Need R
    autonomousTx-r16                        ENUMERATED {enabled}                                             OPTIONAL    -- Cond LCH-BasedPrioritization
    ]]
    ...,
    [[
    mcsAndTBS-variation-r18                 ENUMERATED {pareto, gaussian, ..}                                OPTIONAL,   -- Need R
    ]]
}
```

Figure 12

```
SPS-Config ::=                  SEQUENCE {
    periodicity                     ENUMERATED {ms10, ms20, ms32, ms40, ms64, ms80, ms128, ms160, ms320, ms640,
                                                spare6, spare5, spare4, spare3, spare2, spare1},
    nrofHARQ-Processes              INTEGER (1..8),
    n1PUCCH-AN                      PUCCH-ResourceId                                          OPTIONAL,   -- Need M
    mcs-Table                       ENUMERATED {qam64LowSE}                                   OPTIONAL,   -- Need S
    ...,
    [[
    sps-ConfigIndex-r16             SPS-ConfigIndex-r16                                       OPTIONAL,   -- Cond SPS-List
    harq-ProcID-Offset-r16          INTEGER (0..15)                                           OPTIONAL,   -- Need R
    periodicityExt-r16              INTEGER (1..5120)                                         OPTIONAL,   -- Need R
    harq-CodebookID-r16             INTEGER (1..2)                                            OPTIONAL,   -- Need R
    pdsch-AggregationFactor-r16     ENUMERATED {n1, n2, n4, n8 }                              OPTIONAL    -- Need S
    ]]
    ...,
    [[
    mcsTable-variation-r18          ENUMERATED {pareto, gaussian, .. }                        OPTIONAL,   -- Need R
    ]]
}
```

Figure 13 gNB

UE time

Figure 15:
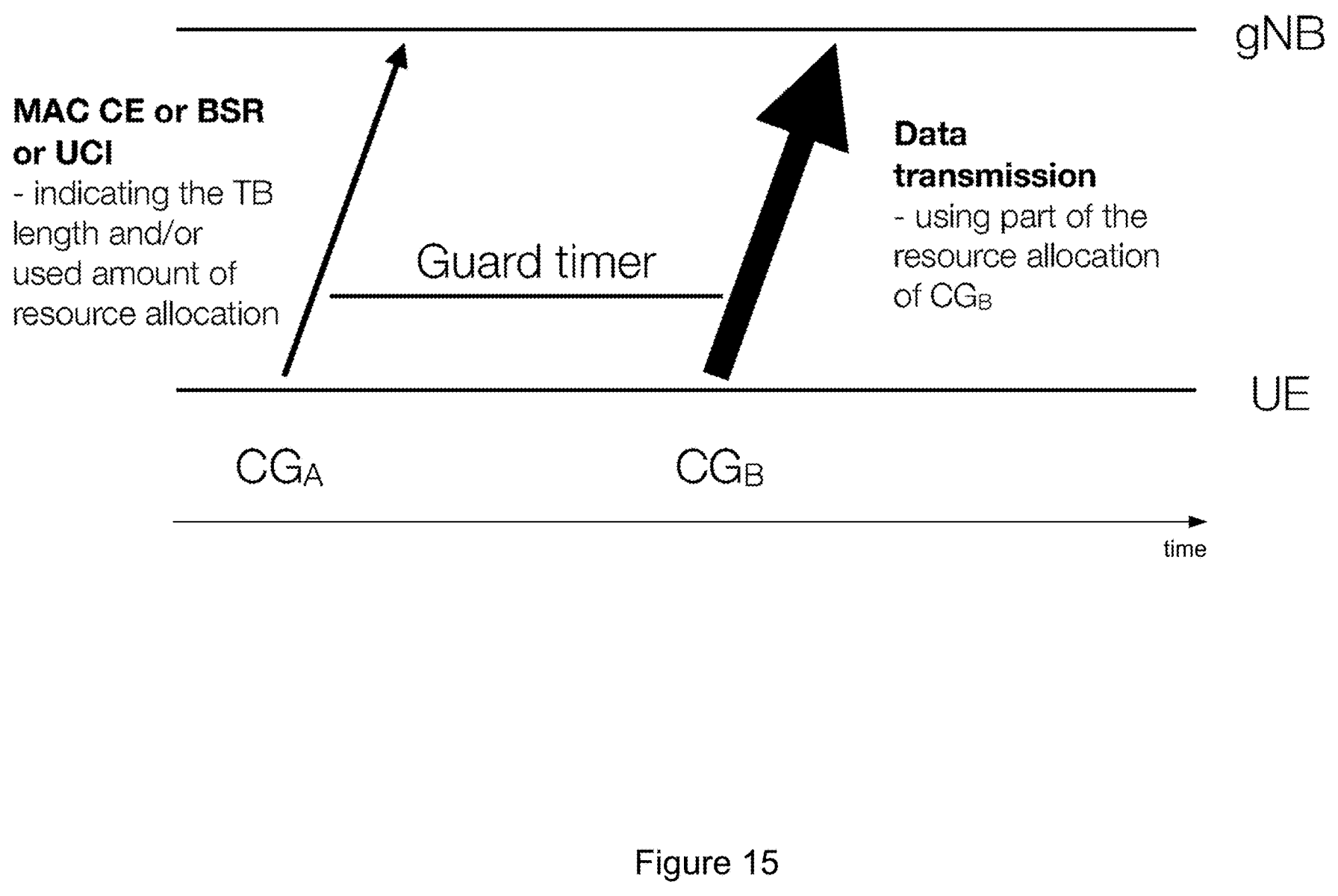

MAC CE or BSR or UCI
- indicating the TB length and/or used amount of resource allocation $CG_A$ Guard timer $CG_B$

Data transmission
- using part of the resource allocation of $CG_B$

Figure 15 gNB

UE time

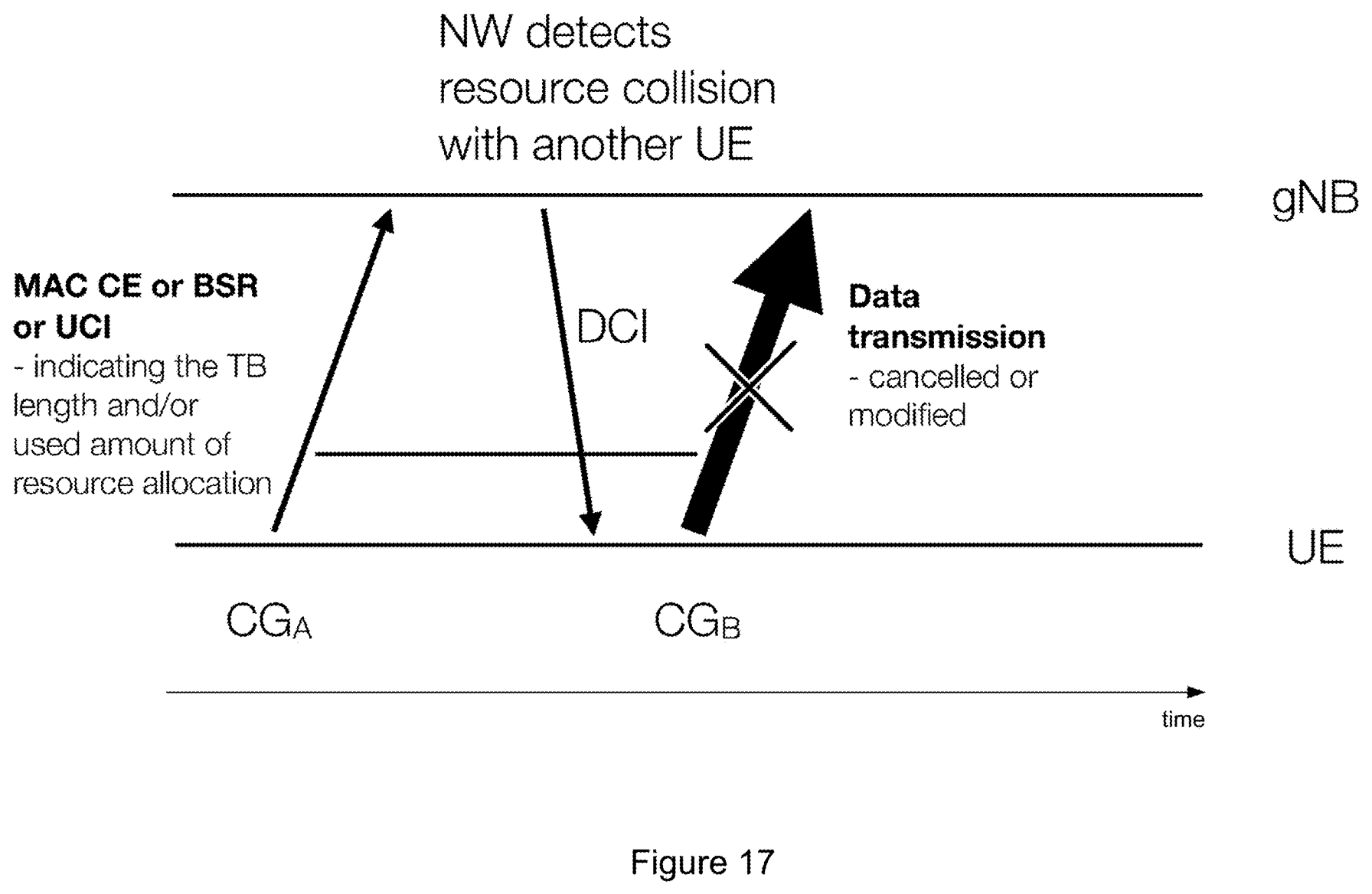

NW detects resource collision with another UE

MAC CE or BSR or UCI
- indicating the TB length and/or used amount of resource allocation

DCI

Data transmission
- cancelled or modified $CG_A$ $CG_B$

Figure 17

RESOURCE ALLOCATION FOR VARIABLE-SIZE DATA BURSTS

CROSS-REFERENCES TO RELATED APPLICATIONS

This application claims priority to and the benefit of U.S. Provisional Application No. 63/274,436, filed on Nov. 11, 2021, which is herein incorporated by reference in its entirety for all purposes.

BACKGROUND

Third Generation Partnership Project (3GPP) Technical Specifications (TSs) define standards for wireless networks, such as Fifth Generation (5G) New Radio (NR) networks. Such networks may be used to transmit multiple kinds of data, such as extended reality (XR) traffic.

BRIEF DESCRIPTION OF THE DRAWINGS

FIG. 2 shows a first part of an example of a signaling option that may be used to allocate uplink resources for an updated CG type according to some embodiments.

FIG. 3 shows a second part of an example of a signaling option that may be used to allocate uplink resources for an updated CG type according to some embodiments.

FIG. 5 shows a second part of an example of a signaling option that may be used to allocate uplink resources for an updated CG type according to some embodiments.

FIG. 6 shows an example of a signaling option that may be used to allocate downlink resources for an updated SPS type according to some embodiments.

FIG. 7 shows another example of a signaling option that may be used to allocate downlink resources for an updated SPS type according to some embodiments.

FIG. 10 shows an example of a pattern of transmission occasions for a CG/SPS configuration with variable periodicity in accordance with some embodiments.

FIG. 12 shows a second part of an example of a signaling option that may be used to allocate uplink resources for an updated CG type according to some embodiments.

FIG. 13 shows an example of a signaling option that may be used to allocate downlink resources for an updated SPS type according to some embodiments in accordance with some embodiments.

FIG. 15 shows an example of a two-fold approach in accordance with some embodiments.

FIG. 17 shows an example of a collision among multiple users in a shared allocation with variable TB size in accordance with some embodiments.

DETAILED DESCRIPTION

Figure 1:
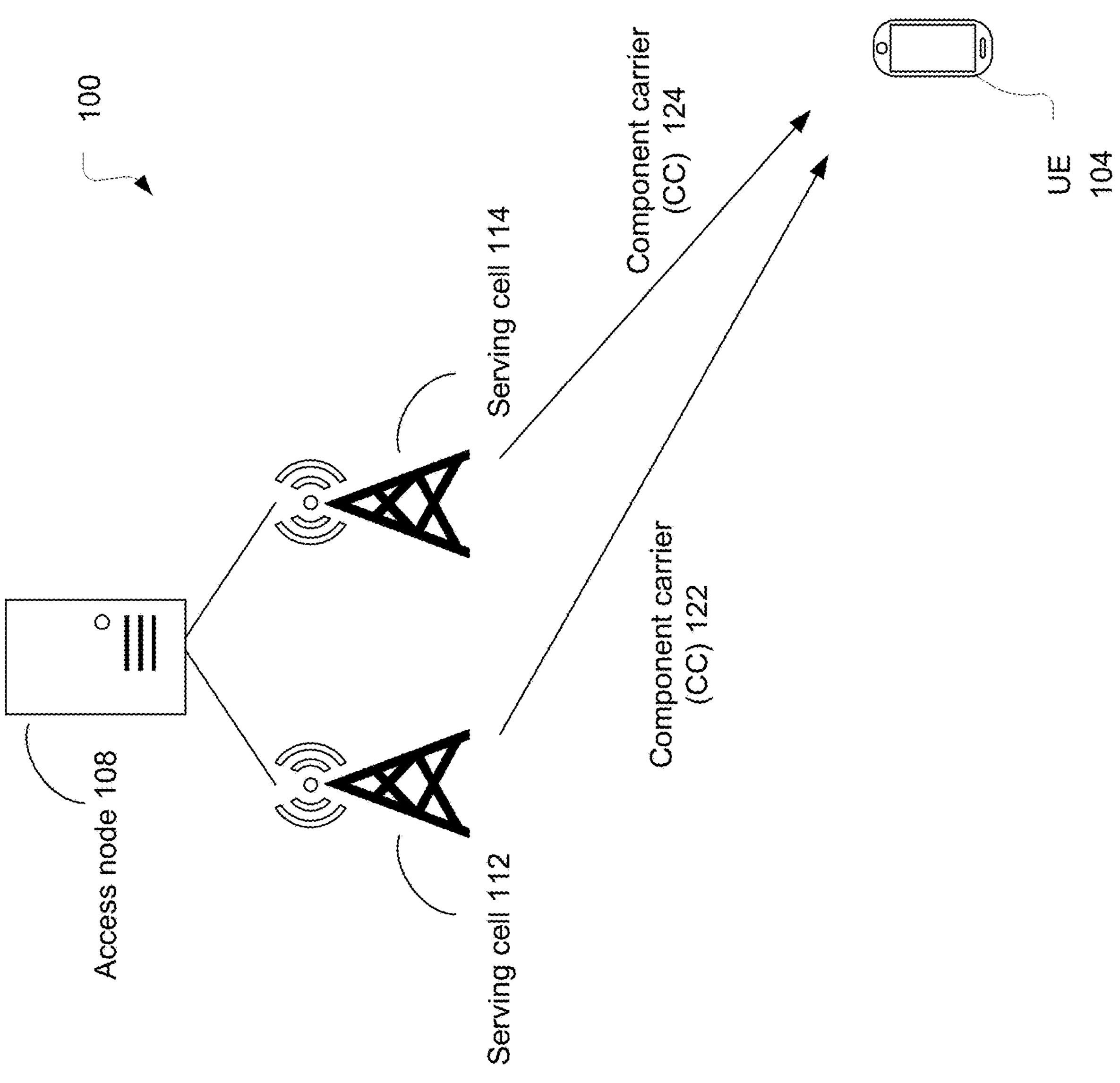
FIG. 1 shows a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). For the purposes of the present document, the phrase "A is based on B" means "A is based on at least B."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point. The term "obtaining" is used to indicate any of its ordinary meanings, such as calculating, deriving, receiving (e.g., from another element or device), and/or retrieving (e.g., from memory/storage as described below).

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" (IE) refers to a structural element containing one or more fields. The term "field" refers to individual contents of an information element, or a data element that contains content. An information element may include one or more additional information elements.

Techniques for transmission of variable-size data bursts are described herein, with respect to both uplink and downlink data transmissions. FIG. 1 illustrates a network environment 100 in accordance with some embodiments. The network environment 100 may include a UE 104 and an access node (or "base station") 108. The access node 108 may provide one or more wireless serving cells 112 and 114, for example, 3GPP New Radio "NR" cells, through which the UE 104 may communicate with the access node 108 (e.g., over an NR-Uu interface). In some aspects, the access node 108 is a Next Generation NodeB (gNB) that provides one or more 3GPP NR cells.

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, a Master Information Block (MIB)), and paging messages.

The access node 108 (e.g., base station or gNB) may use a PDCCH to transmit downlink control information (DCI) to the UE 104. The DCI may provide uplink resource allocations on a physical uplink shared channel (PUSCH), downlink resource allocations on a PDSCH, and various other control information. The DCI may also be used to provide uplink power control commands, configure a slot format, or indicate that preemption has occurred.

The access node (e.g., base station or gNB) 108 may also transmit various reference signals to the UE 104. A Reference Signal (RS) is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 104 to determine the desired downlink beam pair for transmitting/receiving PDCCH and physical downlink shared channel (PDSCH) transmissions. The UE 104 may use a Physical Uplink Control Channel (PUCCH) to transmit uplink control information (UCI) to the access node 108, including, for example, hybrid-automatic repeat request (HARQ) acknowledgements, scheduling requests, and periodic and semi-persistent channel state information (CSI) reports.

The UE 104 may include enhanced Multiple-Input-Multiple-Output (eMIMO) capabilities that support simultaneous communication over beams from several (or even many) different serving cells. FIG. 1 shows an example of carrier aggregation (CA), in which the UE 104 receives data from access node 108 simultaneously from serving cell 112 over a component carrier (CC) 122 and from serving cell 114 over a component carrier (CC) 124.

Transmission of variable-size data bursts may be encountered, for example, in XR applications over 5G NR radio access networks (RANs). XR traffic may include multiple parallel traffic flows (e.g., video data, audio data, sensor data (e.g., pose data), with video traffic typically being dominant) and may be characterized by requirements of short latency and high reliability.

The data burst size (e.g., frame size) may vary over time even at, for example, the same encoding rate. The mean data size may depend on the encoding rate/resolution at the application. For example, the data burst or frame size can be approximated by a truncated Gaussian distribution with the minimum and the maximum frame size. Other statistical distribution functions may be used to model such parameters as well (e.g., Pareto, Poisson, etc.).

It may be desirable for the data burst or frame size of some traffic flows (e.g., video components) to include a variance or spread (e.g., Gaussian distribution). For video, the packet arrival time to RAN for the video traffic (and some XR traffic flows) may be approximated to be periodic and equal to the inverse of a frame refresh rate. Parameters for video traffic may include a frame size in terms of mean, variance, the maximum and the minimum value at least for the minimal acceptable encoding rate, and the frame generation interval. Uplink (UL) traffic may follow a different pattern than downlink (DL) traffic.

According to XR traffic models, the typical transmission intervals may be anticipated to be relatively periodic, but the data burst, frame size, and/or number of packets may be random and follow a statistical distribution. Further, the packet arrival patterns as such (e.g., depending on the sub-type of traffic flows) may be somewhat random as well. Essentially, data packets are produced in bursts, and the amount of data to be transmitted varies over time.

It may be desired to introduce scheduling enhancements for XR. For example, a resource allocation to address such kind of a traffic pattern may be considered. A gNB may rely, for example, on a) over-provisioning of radio resources and/or b) dynamic resource allocation, in which UEs send scheduling requests (SR) and buffer status reports (BSR) according to their instantaneous demand. Drawbacks associated with over-provisioning may include that spectral efficiency and/or system capacity may become an issue. Because XR traffic may be latency-critical, drawbacks associated with dynamic resource allocation may include that SR/BSR-based scheduling may incur a higher delay as compared to configured grant (CG) or semi-persistent scheduling (SPS).

Techniques disclosed herein include methods for allocation of radio resources that use a more balanced approach. In such manner, disadvantages associated from over-provisioning and/or dynamic resource allocation (e.g., impact on latency) may be reduced.

For XR traffic, packet arrival rates of some traffic flows are relatively periodic (e.g., based on frames per second (FPS)) but the frame/data size can vary. More specifically, the amount of data to be transmitted (and/or even the packet arrival rate, for some flows) can follow a statistical distribution function such as a Pareto distribution, a truncated Gaussian distribution, a Poisson distribution, etc. This distribution over time results in a varying amount of packets arriving at lower layers. Configured Grant (CG) in UL or semi-persistent scheduling (SPS) in DL may be preferred resource allocation methods for XR traffic because, for example, they may allow a reduction in latency as compared to a traditional dynamic grant (DG) in UL or dynamic assignments in DL.

To optimize the periodicity and/or grant size for a data flow having such behavior, a traffic function can be defined which approximately follows the most likely path for the data size or the arrival rate. This traffic function can be used to create a new type of CG/SPS having a variable periodicity and/or a variable grant size. In order to obtain a resource allocation that is deterministic, the allocation can follow a prediction based on a statistical distribution (e.g., Pareto, truncated Gaussian, etc.) expressed as a series of deterministic events over a period of time. The allocation may be modeled based on a distribution using, for example, profiles. If a fixed set of varying periodicity and/or grant size values (for a period of time) can be defined in a table, or if such values may be derived using a formula that yields a result which is unique (but still sufficiently close to the approximation), then it may be sufficient to reference the distribution function. In addition, input parameters to such a function (such as, for example, variance, mean, maximum size, minimum size, random seed, delay, service rate, shape, scale, etc.) may be signaled over radio resource control (RRC) signaling or another layer (e.g., medium access control (MAC), Service Data Adaptation Protocol (SDAP), or Layer 1 (L1)). By signaling a pointer (e.g., an index into a table) or by reference to a parameterized statistical traffic function (function name, associated parameters), the function allows an actual allocation to be computed based on the signaled values.

It may be assumed that the UE and the network are able to link traffic flows with an associated 5G QoS identifier (5QI) or QoS Flow Identifier (QFI) and its respective logical channel according to a traffic characteristic. In such case, UL grants and DL assignments can be allocated accordingly. Such an association of traffic flow and a QoS or QoS flow identifier may be performed based on such an implementation or based on other mechanisms.

It may be desired to use artificial intelligence (AI) to model a traffic flow. For example, a model (e.g., a machine learning (ML) model) may be trained to learn packet arrival rates and/or data sizes at the gNB over time, and the network may periodically adjust the distribution based on actual observed values. Further, the gNB may configure the UE with a distribution model and ask the UE to follow it. The configuration may be given as a parameter in RRC signalling, in a MAC control element (CE), in SDAP, or over the DCI. Using AI/ML, a UE may predict a traffic pattern (e.g., including the statistical distribution function and associated parameters). The UE may also inform the network of the predicted results through RRC signalling, a MAC CE, via SDAP, or using uplink control information (UCI). The network may control the applicability of a value range (or the prediction in general) through, for example, a set of distribution models and additional parameters that are suitable and/or possible for the network to support.

As described above, the UE may inform the network of a statistical distribution function and associated parameters that are assumed to be used for a given traffic flow. Such assistance information may be sent, for example, as an additional parameter in a UEAssistanceInformation message over RRC or in a Scheduling Assistance Information message. A UE Scheduling Assistance Information message that indicates the new pattern distribution function and associated parameters may be transmitted, for example, via RRC, a MAC CE, or as part of an SDAP Control protocol data unit (PDU). Such assistance information may be used to trigger a traffic pattern switch from one distribution function to another, to adjust the parameters within the distribution function itself, and/or to provide additional information on any of the input parameters. The assistance information may be a separate parameter in addition to the happyBit mechanism described below.

For a given traffic flow, the UE may use a single bit to indicate whether it is happy with the current resource allocation. This bit (happyBit) is set to "happy" if the resource allocation satisfies the current pattern and/or demand, and the bit is set to "not happy" if the UE could use additional resources. If a UE has multiple variable traffic patterns that each follow a distribution function, multiple bits may be used (e.g., in a happyBit bitmap). A single happyBit or a happyBit bitmap may be signaled as an additional parameter in a UEAssistanceInformation message over RRC, in a UE Scheduling Assistance Information message, or as a parameter in RRC, in a MAC CE, in UCI, or in an SDAP Control PDU.

Additionally or alternatively, a set of distribution functions (e.g., Pareto, truncated Gaussian, etc.) may be defined in a bitmap. Such a bitmap (patternSwitch) can be used to suggest a pattern switch to the network. Such a bitmap may use, for example, a single bit for each distribution function. Alternatively, such a bitmap may use a bit pattern to indicate the selected distribution function (e.g., by indicating an index number that is associated with the distribution function).

For a case in which the patternSwitch bitmap uses a single bit for each distribution function, the bit may be set for any suggested distribution function (e.g., a distribution function that would provide a scheduling benefit as compared to the current resource allocation). This option may be configured to accommodate single bits or even multiple bits being set at the same time (e.g., within the same instance of the bitmap). It may be desired to set multiple bits at the same time if, for example, multiple alternative distribution functions would each provide a benefit at a corresponding given point in time.

For a case in which the patternSwitch bitmap uses a bit pattern to indicate the selected distribution function, the range of bit patterns may be selected to indicate only one distribution function at a time. Alternatively, the range of bit patterns may include (additionally or alternatively) patterns that indicate multiple alternative distribution functions (if, for example, the multiple alternative distribution functions would each provide a benefit at a corresponding given point in time).

It may be desired to use a patternSwitch bitmap only as a trigger for a desired pattern switch. For example, the details and parameters associated with each distribution function may be specified elsewhere (e.g., in a memory of the UE). As with other parameters as described above, this bitmap can be signaled as an additional parameter in a UEAssistanceInformation message over RRC, in a UE Scheduling Assistance Information message, or as a parameter in RRC, in a MAC CE, UCI, or in an SDAP Control PDU. The values of parameters associated with the indicated distribution function(s) may be signaled in one or more among the same range of assistance or control communications.

It may be desired to define a new type of CG, and/or a new type of SPS, having a variable periodicity (e.g., to allow for a variable amount of data to be sent over time). For example, the periodicity of the CG/SPS allocation may be defined to vary over time based on a statistical distribution function (e.g., to match allocation of a transmission-time resource with an expected traffic pattern distribution). If the amount of data to be sent is less than what the allocated resources can accommodate, the UE may skip the grant of a particular CG occasion. Potential advantages of such a CG/SPS configuration may include a limited amount of intermediate buffering required, reduced latency, less processing (power saving), and/or that the data is sent together in a group.

A CG/SPS configuration having a variable periodicity may include new IEs to indicate the statistical distribution to be followed, and the actual periodicity values may be additionally specified in a separate table (e.g., a table that is associated with the indicated distribution and may reside in a memory of the UE). Alternatively, the periodicity values themselves may be signaled in a list. Such a list may be essentially a list of multiple periodicity values (e.g., a list of sequences of periodicity values, as described below).

One example of a signaling option that may be used to allocate uplink resources for an updated CG type begins on FIG. 2 and continues on FIG. 3. This example is a modification of a ConfiguredGrantConfig IE as specified in clause 6.3.2 ("Radio resource control information elements") of 3GPP TS 38.331 ("5G; NR; Radio Resource Control (RRC); Protocol specification," v16.6.0 (2021 October)). As shown in FIG. 3, this example realization includes a CG parameter periodicityList-r18 that specifies a sequence of multiple periodicity values associated with a CG configuration. As a result, the number of bytes that can be sent over a period of time becomes variable, and the values in the sequence may be selected such that the number of bytes in the allocation varies over time according to a desired distribution function. One example of such a sequence is as follows:

periodicityList-r18={sym2, sym2×14, sym2, sym2, sym1×14, sym2, sym2, sym2, sym1×14, sym2, sym2, sym2×14, sym2}

The UE may be configured to cycle through the periodicity list as a whole, starting from the first periodicity in the list to the last one, then starting again in round-robin fashion. The same principle can be used in a realization of a SPS-Config IE that may be used to allocate downlink resources for an updated SPS type as well. In either case, a different set of RRC parameters indicating the statistical distribution is not precluded.

Figures 4A, 4B:
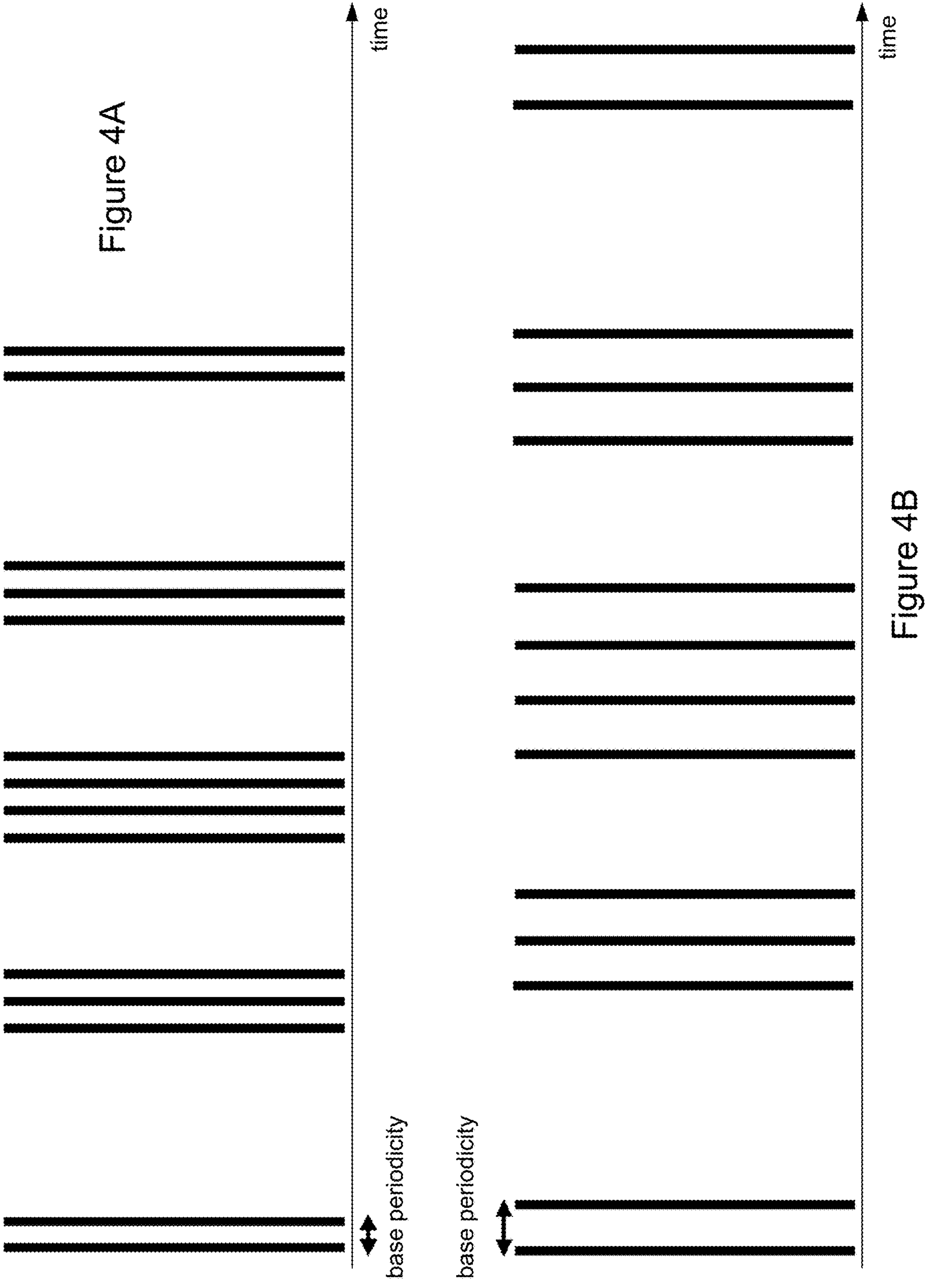
FIGS. 4A and 4B show examples of patterns of transmission occasions for two corresponding CG configurations according to some embodiments.

A CG/SPS configuration having a variable periodicity may use a base periodicity value (e.g., to indicate a least common multiple of the periodicities). Such a base periodicity value may be implemented, for example, as a 5G NR Release 15 ("Rel-15" or "r15") periodicity value (e.g., for backward compatibility). FIGS. 4A and 4B show examples, on the same time scale, of patterns of transmission occasions for two corresponding CG configurations. The periodicities of these two patterns vary over time according to the same distribution function (in this case, the distribution is as described in the periodicityList-r18 example sequence above; the overall periodicity distribution may also be defined in a table), but the patterns differ from one another because the base periodicity for the pattern in FIG. 4B is larger than the base periodicity for the pattern in FIG. 4A.

Another example of a signaling option that may be used to allocate uplink resources for an updated CG type begins on FIG. 2 and continues on FIG. 5. This example is another modification of a ConfiguredGrantConfig IE as specified in clause 6.3.2 of 3GPP TS 38.331. As shown in FIG. 5, this example realization includes a CG parameter periodicity-variation-r18 that indicates a statistical distribution function. In such an allocation, the periodicity-variation-r18 parameter may be implemented to work together with a periodicity parameter (e.g., the Rel-15 periodicity parameter) such that the periodicity parameter is used as a base and the periodicity-variation-r18 parameter indicates a statistical distribution of the base. Alternatively, the base periodicity could be defined in a separate new (e.g., Release 18 ("r18" or "R18")) parameter as, for example, a bitmap or a list. As a result, the number of bytes that can be sent over a period of time becomes variable. To achieve a unique mapping for the periodicity values, the exact distribution of resulting periodicity values (e.g., including the gaps) for each combination of periodicity and periodicity-variation-r18 may be specified in a table as well. The same principle can be used in a realization of a SPS-Config IE that may be used to allocate downlink resources for an updated SPS type as well. In either case, a different set of RRC parameters indicating the statistical distribution is not precluded.

One example of a signaling option that may be used to allocate downlink resources for an updated SPS type is shown in FIG. 6. This example is a modification of a SPS-Config IE as specified in clause 6.3.2 of 3GPP TS 38.331. This example realization includes a CG parameter periodicityList-r18 that specifies a sequence of multiple periodicity values associated with a CG configuration and may be implemented according to the same principles as described above with reference to FIG. 3.

Another example of a signaling option that may be used to allocate downlink resources for an updated SPS type is shown in FIG. 7. This example is another modification of a SPS-Config IE as specified in clause 6.3.2 of 3GPP TS 38.331. This example realization includes a CG parameter periodicity-variation-r18 that indicates a statistical distribution function associated with a CG configuration and may be implemented according to the same principles as described above with reference to FIG. 5.

Figure 8:
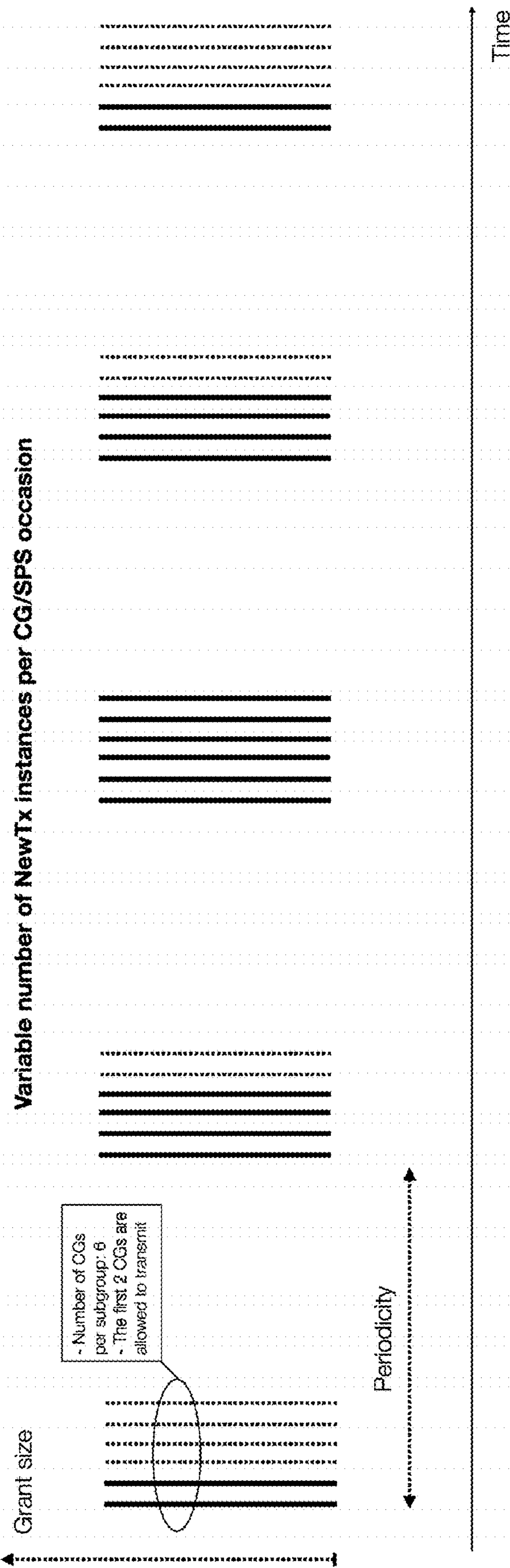
FIG. 8 shows an example of a pattern of transmission occasions for a CG/SPS configuration with variable capacity in accordance with some embodiments.

FIG. 8 shows an example of a pattern of transmission occasions for a CG/SPS configuration with variable capacity according to another approach. In this approach, the resource allocation specifies subgroups of potential transmission occasions (indicated by vertical lines), wherein the potential transmission occasions of each subgroup have a first periodicity (e.g., a fixed periodicity, which may be a Rel-15 periodicity value) and the subgroups themselves have a larger second (inter-subgroup) periodicity (e.g., a fixed periodicity). For each subgroup, the number of the potential transmission occasions that are actually allocated by the CG/SPS configuration (as indicated by the solid vertical lines) is variable, and the number of potential transmission occasions with an active transport block (TB) transmission in each subgroup may follow a statistical distribution function (or another defined pattern). Such a CG/SPS configuration may include new IEs (e.g., as described above with reference to FIGS. 2, 3, and 5-7) to define parameters such as, for example, the number of TB instances per CG/SPS occasion (e.g., within each subgroup) and/or the overall distribution (or pattern) to be followed.

Figure 9:
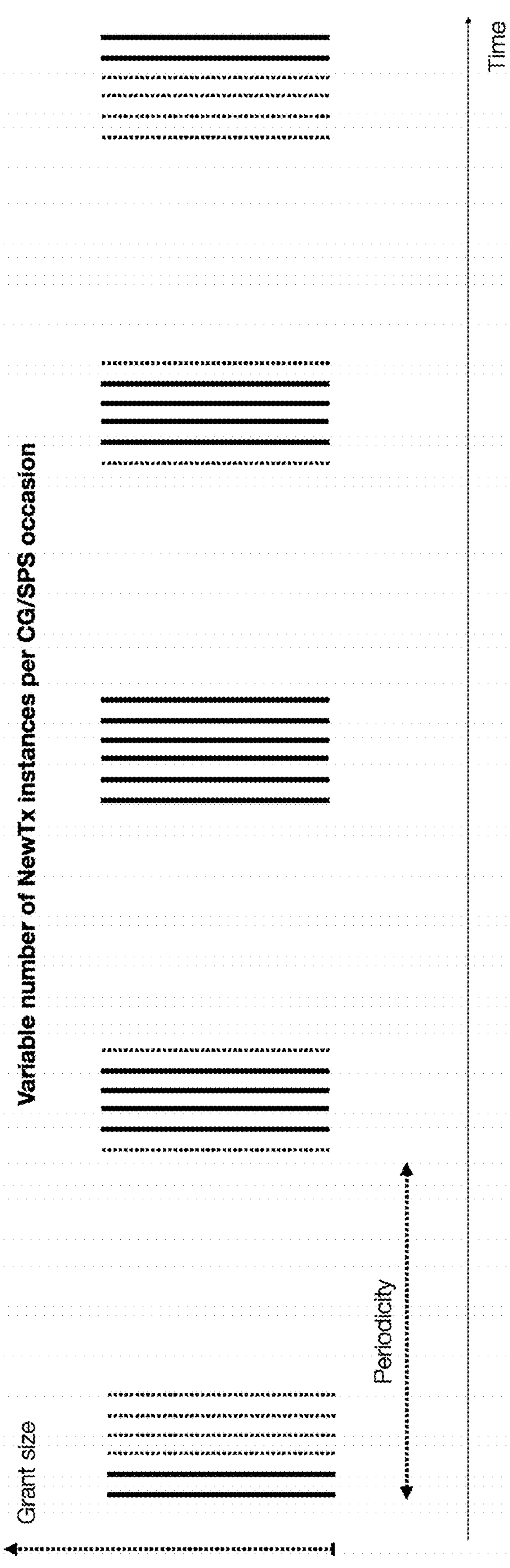
FIG. 9 shows another example of a pattern of transmission occasions for a CG/SPS configuration with variable capacity in accordance with some embodiments.

FIG. 9 shows another example of a pattern of transmission occasions for a CG/SPS configuration with variable capacity according to the approach as described above with reference to FIG. 8. An allocation according to this example, which is further optimized, may include another IE (e.g., as described above with reference to FIGS. 2, 3, and 5-7) to distinguish the mode of operation from the distribution option as described above with reference to FIG. 8 (e.g., by indicating which of the potential transmission occasions within each subgroup are allocated to have an active transport block (TB) transmission).

Figure 10:
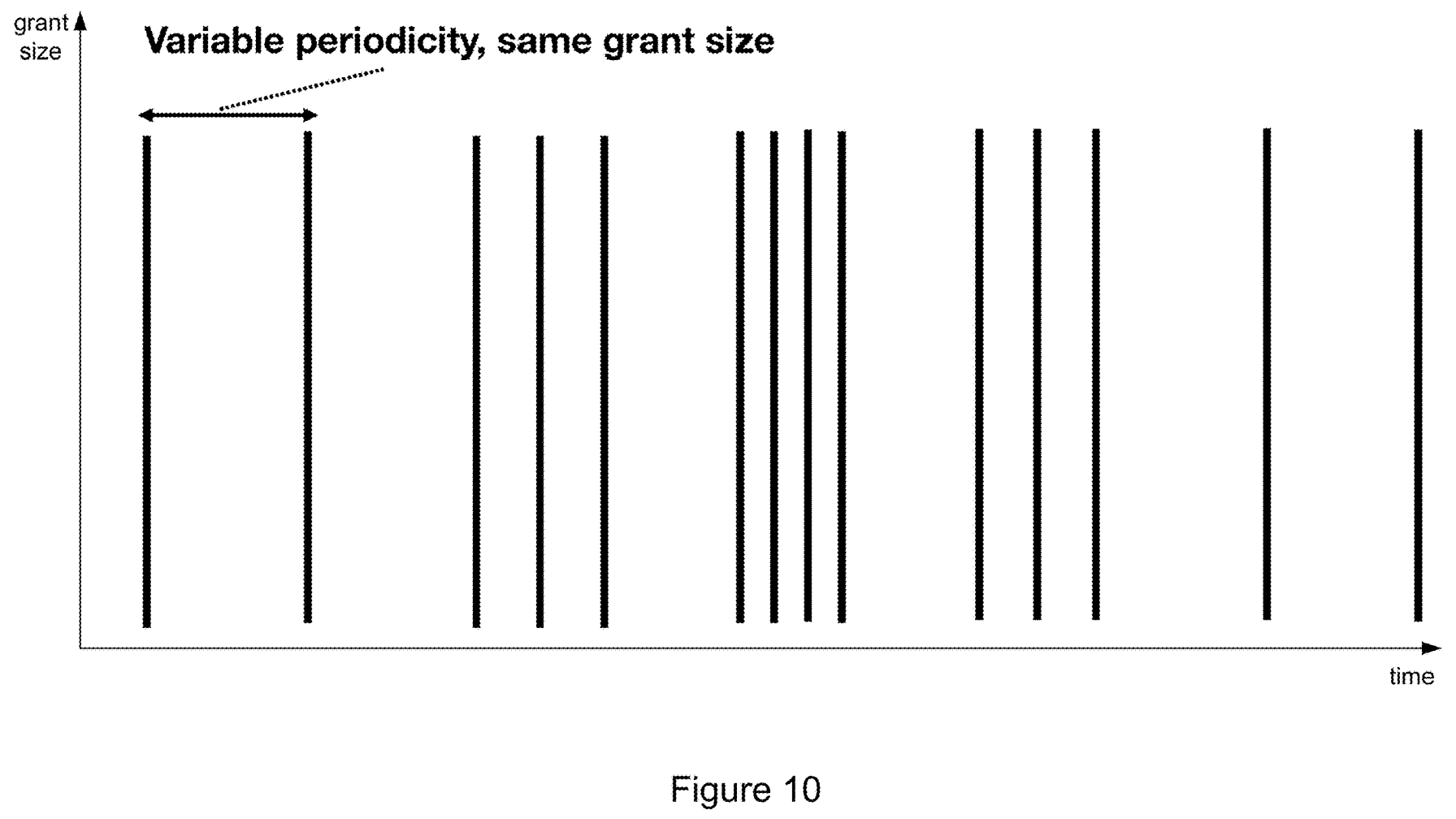

FIG. 10 shows an example of a pattern of transmission occasions for a CG/SPS configuration with variable periodicity according to a further approach. In this approach, the periodicity variation itself follows a statistical distribution (or another function and/or pattern). Such a principle of modifying the periodicity may be considered as conceptually similar to the principle of frequency modulation. It may be desired to specify the actual periodicity distribution and/or pattern in a table (e.g., to avoid odd values falling in between a symbol), which may be signaled using one or more among the range of assistance or control communications listed above. Potential advantages may include a limited amount of intermediate buffering required, reduced latency, less processing (power saving), and/or that the data is sent together in a group. In this example, the periodicity may change over time without reference to a base periodicity value (e.g., the Rel-15 periodicity value described above).

Figures 11A, 11B:
FIGS. 11A and 11B show examples of patterns of transmission occasions over time (horizontal axis) for two corresponding CG/SPS configurations with varying grant size in accordance with some embodiments.

In addition or in the alternative to a variable periodicity as described above, it may be desired to define a new type of CG, and/or a new type of SPS, having a variable grant size (e.g., to allow for a variable amount of data to be sent over time). For example, the grant size of the CG/SPS allocation may be defined to vary over time based on a statistical distribution function or based on a fixed pattern (e.g., to match allocation of a transmission-time resource with an expected traffic pattern distribution). FIGS. 11A and 11B show examples of patterns of transmission occasions over time (horizontal axis) for two corresponding CG/SPS configurations with varying grant size. In each of these examples, the relative grant sizes of the transmission occasions (shown as vertical bars) are indicated along the vertical axis. The allocated pattern shown in FIG. 11A has a fixed periodicity (e.g., a Rel-15 periodicity value), and the allocated pattern shown in FIG. 11B includes subgroups of transmission occasions, wherein the transmission occasions of each subgroup have a first periodicity (e.g., a fixed periodicity, which may be a Rel-15 periodicity value) and the subgroups themselves have a larger second (inter-subgroup) periodicity (e.g., a fixed periodicity).

To allow for a variable amount of data to be sent over time, it may be desired to modify the TB size (TBS). One such option is to modify the number of resource elements (REs) for different TBs in the set, as the number of REs is an input to the TBS calculation. Another such option is to modify the value of an mcsAndTBS parameter for different TBs in the set. While some implementations of these options may involve complicated signaling, a varying grant size may be implemented in a less complicated manner by using a varying number of OFDMA symbols (e.g., a varying transmission duration). For example, different TBs in a set may use a varying number of OFDMA symbols (transmission duration).

Such kind of allocation may be used if the traffic pattern is relatively stable. While a similar allocation might be achieved by staggering multiple CGs of different TB size, multiple CGs may be more expensive in terms of UE processing. Potential advantages of CG/SPS configurations with varying grant size may include a limited amount of intermediate buffering required, reduced latency, less processing (power saving), and/or that the data is sent together in a group.

As defined at clauses 5.1.3.2 (DL) and 6.1.4.2 (UL) of 3GPP TS 38.214 ("5G; NR; Physical layer procedures for data," v16.6.0 (2021 August)), the determination of transport block size (TBS) is based on inputs that include the modulation and coding scheme (MCS), the number of REs, and several tables. It may be desired to signal and configure the time/frequency domain resource allocation in such a way that the number of REs may be varied. For example, for a given instance of a CG occasion or a dynamic grant (DG), it may be desired to vary the number of REs associated with a TB instance over time within the set of TBs in the CG occasion or DG. The time domain resource allocation and/or the frequency domain resource allocation may carry an indication as to how the resource allocation of associated TBs changes to follow a desired distribution. For DG and DL assignments, the time resource assignment and/or frequency resource assignment fields in the DCI may be used to signal the format (e.g., including the statistical distribution), and IEs such as PUSCH-config, PDSCH-config, and/or configuredGrantConfig (which are specified in clause 6.3.2 of 3GPP TS 38.331) may also be changed (e.g., to include additional parameters and/or modify existing parameters as described herein).

As noted above, it may be desired to vary grant size over time by modifying the number of REs. As described in clauses 5.1.3.2 (DL) and 6.1.4.2 (UL) of 3GPP TS 38.214, the number of REs within a slot is determined based on parameters including the number of resource blocks (RBs) and the number of symbols of the allocation (e.g., the transmission duration). It may be desired to make the number of RBs and/or the transmission duration configurable according to a distribution. For example, it may be desired to indicate a time and frequency resource allocation for a given set of CG/SPS with varying TB size distribution within a set by signaling a pattern type or pattern number. However, scaling the number of REs by changing the time/frequency resource allocation may involve changing multiple parameters (e.g., multiple L1 parameters) in a coordinated manner. Examples of parameter updates that may be performed to implement such capability to change the time/frequency resource allocation may include the following:

1) For PDSCH-config: a) pdsch-TimeDomainAllocationListTBDistributionX-r18 SetupRelease {PDSCH-TimeDomainResourceAllocationList-r16}, where X indicates the statistical distribution, and different lists with sequences of Start and Length Indicator (SLIV) values may be provided for a given set of TBs. b) A different pdsch-AggregationFactor may be provided per TB instance.
2) For PUSCH-config and/or configuredGrantConfig. a) pusch-TimeDomainAllocationListTBDistributionX-r18 SetupRelease {PUSCH-TimeDomainResourceAllocationList-r16}, where X indicates the statistical distribution, and different lists with sequences of Start and Length Indicator (SLIV) values may be provided for a given set. b) Depending on the amount of TB size scaling required, multiple other parameters may be tuned in a list as well, such as one or more of: rbg-Size; timeDomainAllocation; frequencyDomainAllocation; resourceAllocation; resourceAllocationDCI-0-2; resourceAllocationDCI-1-2; resourceAllocationType1GranularityDCI-0-2; resourceAllocationType1GranularityDCI-1-2.

One example of a signaling option that may be used to allocate uplink resources for an updated CG type begins on FIG. 2 and continues on FIG. 12. This example is a modification of a ConfiguredGrantConfig IE as specified in clause 6.3.2 of 3GPP TS 38.331. As shown in FIG. 12, this example realization includes a CG parameter mcsAndTBS-variation-r18 that may be used to change the grant size (mcsAndTBS) for different TB instances of a CG configuration based on a statistical distribution (e.g., a desired distribution function). TBS may be determined from configuredGrantConfig according to, for example, the rules in 3GPP TS 38.214 (e.g., clause 6.1.4.2 as referenced above). As a result, the number of bytes that can be sent over a period of time becomes variable.

In general, it may not always be desired to change the MCS for different TB instances in a set (e.g., for reasons of complexity). However, it may be desired to change the MCS for different TB instances in a set for a case in which different TBs are associated with transmission of different application data units (ADUs). For a video coding application, for example, some ADUs (e.g., video frames that are encoded without information from other frames, such as intra-coded frames ("I-frames")) may require a different level of protection than other ADUs (e.g., video frames that are encoded using prediction from a reference frame, such as predicted frames ("P-frames," also called "delta-frames")). It may be desired to use values of mcsAndTBS for transmissions of I-frames that are different than values of mcsAndTBS used for transmissions of P-frames.

One example of a signaling option that may be used to allocate downlink resources for an updated SPS type is shown in FIG. 13. This example is a modification of a SPS-Config IE as specified in clause 6.3.2 of 3GPP TS 38.331. This example realization includes a CG parameter mcsAndTBS-variation-r18 that may be used to change the grant size (mcsAndTBS) for different TB instances of an SPS configuration based on a statistical distribution (e.g., a desired distribution function) and may be implemented according to the same principles as described above with reference to FIG. 12. TBS may be determined from SPS-Config according to, for example, the rules in 3GPP TS 38.214 (e.g., clause 5.1.3.2 as referenced above). As a result, the number of bytes that can be sent over a period of time becomes variable.

Figure 14:
FIG. 14 shows an example of a DG with variable grant size in accordance with some embodiments.

Following the same principle as described above with respect to new types of CGs and SPSs, dynamic grants (DG) may also be enhanced such that a single DCI is used to schedule multiple consecutive transport blocks of varying grant size with one DG configuration. As shown in the example of FIG. 14, such a DG with variable grant size may include multiple TB instances in which the TB size of each instance is defined by a statistical distribution function or a pattern. The number of DG instances allocated in the DG configuration may be specified in a separate parameter (e.g., on the DCI and/or in RRC). It may be desired to specify the actual TB size distribution and/or pattern in a table (e.g., to avoid odd values falling in between a symbol). Such a DG configuration may reduce signalling overhead and/or help to save UE power (e.g., due to less PDCCH processing). Furthermore, the gNB may have less processing overhead as well.

If traffic patterns are much more random (e.g., too random to be modeled reliably over time by a distribution function as described above), the data burst size and/or the packet arrival times may vary quite a bit over time. If such traffic is mapped to a CG (e.g., for better latency), over-provisioning of resources may be implemented, which may create a potential that CGs are frequently skipped or that a lot of padding occurs. The network does not know in advance whether the UE is going to use a CG or not, and thus spectral efficiency may be rather low for random data.

In a basic approach, it may be desired to introduce a mechanism for the UE to inform the network whether the UE will use the CG (e.g., with a special type of CG). If the network may know in advance that the UE will not use a CG, the network can assign the respective radio resources of that CG to a different UE. Similarly, if the network may know in advance that the UE will require only a subset of the grant, the network may allocate a remainder of the grant to a different UE.

Such an approach may be two-fold. In a first part, the UE may indicate to the network whether the UE will use the CG. The UE may send this indication, for example, in a new MAC CE, using a new BSR type (or a BSR with new parameters), in a new type of UCI sent by L1, or even in a new L1 signal. The UE may send such a notification of grant use (e.g., MAC CE/BSR/UCI/L1 signal) over a separate CG or, alternatively, on a dynamic grant (DG). In a second part, for the actual data transmission, the network may allocate a special type of CG which the network will expect only if a corresponding notification of grant use (e.g., MAC CE/BSR/UCI/L1 signal as described above) was successfully received in advance.

FIG. 15 shows an example of this two-fold approach in which the CG allocated for the indication of grant use is designated as $CG_A$ and the CG allocated for the corresponding data transmission is designated as $CG_B$. (As noted above, the $CG_A$ may also be implemented using a DG.) $CG_A$ and $CG_B$ may reside on the same component carrier (CC) or on different CCs. If the network has not received a notification of grant use for the next $CG_B$ in $CG_A$ (e.g., by the start of a guard interval in advance of the $CG_B$), then it may allocate the radio resources in the $CG_B$ to a different UE. In other words, the network will only expect $CG_B$ from the UE if the UE has already indicated its validity in advance (e.g., using $CG_A$ for that purpose). The $CG_B$ may be implemented as a larger CG (e.g., a CG which can accommodate up to the maximum TB size of the traffic pattern). In contrast, the grant size of $CG_A$ may be very small. It may be desired to configure the UE to transmit the $CG_A$ using a physical layer configuration of higher reliability.

It may be desired for the network to schedule $CG_A$ and $CG_B$ in close proximity. Such proximity may allow for the UE to construct a TB based on its buffer status, which presumably needs to be done some time in advance. It may be desired, for example, to schedule $CG_A$ (or UCI) to occur only a few symbols before $CG_B$. It may be expected that as the distance in time between $CG_A$ and $CG_B$ increases, the resulting impact on latency will increase as well.

In a modification of the basic two-fold approach (as also shown in FIG. 15), the UE also indicates how much of the grant allocation of $CG_B$ the UE will use. In this case, before transmission of $CG_B$, the UE may send the network an indication of the amount of data (e.g., the exact amount of data) that the UE will send on the pre-allocated time/frequency resources of $CG_B$ (e.g., the number of bytes currently available, allotted, or selected for transmission in the respective logical channel (LCH) or transmission buffer associated with $CG_B$). The UE may send this indication in, for example, a special MAC CE (e.g., in $CG_A$), BSR type (e.g., in $CG_A$), or UCI (e.g., in $CG_A$ or on PUCCH). As a result of this indication, the network may know which part of the spectrum that the UE will use. As the indication (e.g., the MAC CE or BSR or UCI) comes in advance of $CG_B$, the network may still assign the remaining unused grant size (of $CG_B$) to a different UE.

For a case in which the indication of how much of the grant allocation of $CG_B$ the UE will use is sent in $CG_A$, the indication may serve as the notification of grant use as described above. As an option, the UE may send the indication of how much of the grant allocation of $CG_B$ the UE will use (e.g., the MAC CE or BSR or UCI containing the content of $CG_A$ as described above) in a different CG or DG ("$CG_C$") if, for example, the transmission happens to occur in the timeframe between $CG_A$ and $CG_B$ (e.g., as defined by the guard interval as described below).

For a case in which the UE does not use the whole grant in $CG_B$, it may be desired that the UE does not include padding in $CG_B$ (e.g., for the rest of the huge pre-allocated grant). For example, it may be desired for the MAC PDU for $CG_B$ not to require the UE to include padding for up to the maximum amount of data in the $CG_B$. Instead, it may be desired for the TB size of $CG_B$ to be variable according to, for example, an indication given in $CG_A$. For example, the MAC CE (or BSR or UCI or L1 signal) may indicate a TB size (e.g., may include a TB size parameter), and the UE may shorten the TB based on the size indicated (e.g., in the MAC CE or BSR or UCI or L1 signal). Additionally or alternatively, the MAC CE (or BSR or UCI or L1 signal) may contain an indication as to which time/frequency resources (e.g., within the large grant) the UE will use in $CG_B$. While a new L1 signal may be used for signalling the TB size, such a new L1 signal may not be needed if the information is carried on a higher layer (e.g., MAC CE or BSR type).

The UE may start a guard timer (e.g., having a duration of a predetermined guard interval) upon sending the notification of grant use of the next $CG_B$ in $CG_A$. Upon expiration of the guard timer, the UE may assume an ACK for $CG_A$ and may start transmitting on $CG_B$ (e.g., using the number of bytes and/or resource allocation as indicated in the MAC CE or BSR or UCI or L1 signal as described above). Alternatively, an explicit HARQ ACK may be implemented. If the network sends a NACK on the DCI in response to a $CG_A$ (e.g., using the CS-RNTI or by using a retransmission grant), then it may be desired for the UE to retransmit the $CG_A$. Such retransmission may occur, for example, on a DG.

The latency of an implementation of the two-fold approach may be reduced if, for example, an ACK (or a guard interval) is not required in response to $CG_A$. In such cases, $CG_A$ or even a new type of UCI may be scheduled even closer to $CG_B$. However, such a reduction in latency may come at the expense of less reliable operation. If the uplink transmission of $CG_A$ is not detected by the gNB, for example, then the network may be unable to process $CG_B$. Additionally or alternatively, processing demands on the gNB (e.g., in order to re-allocate an unused grant to another UE in time for the other UE to use it) may be more strict. An option of whether to require an ACK to $CG_A$ (and/or whether to require a guard interval between $CG_A$ and $CG_B$) may be configurable or enabled based on, for example, the environment and/or radio conditions.

In principle, such a solution (e.g., $CG_B$) may be realized as multiple overlapping grants as well, but those grants are specifically marked (the UE uses only one of them at a time), and additional resource/processing overhead might be incurred. For example, $CG_B$ may be expressed as multiple overlapping CGs, and in such case the UE may indicate in $CG_A$ which of these multiple overlapping grants it will use. The multiple overlapping grants may be specially marked (e.g., by a parameter that indicates the association with $CG_A$) to distinguish them from other overlapping grants, which may be complicated to handle in MAC layer processing. Alternatively, $CG_B$ may be implemented as multiple normal CGs that overlap (e.g., without such special marking).

The two-fold approaches described above may also be extended to share a CG allocation among multiple UEs (e.g., with variable TB size). Such an extension may be desired, for example, in a case where the data to be sent is random and multiple UEs may have random data of the same type (e.g., XR traffic), such that multiple UEs may share a common resource allocation of the same characteristic (e.g., time/frequency resources, block error ratio (BLER), latency, etc.).

In a shared allocation context, a $CG_B$ as described with reference to FIG. 15 may be extended as a shared CG that can accommodate the maximum TB size of the traffic pattern or an even higher amount of data. Assuming that the CG is not frequently used, it may be more spectrally efficient to share it with other users who are also using a (similar) random traffic pattern. The $CG_B$ may be implemented as a common/shared CG where multiple UEs can use the same time/frequency resources. (While such an arrangement could be realized as multiple overlapping grants for each UE as well, it may be desired to mark those grants as shared grants.) Since the data (e.g., traffic pattern) is random, it may be assumed that typically only a subset of the UEs will use the grant at a given time, and that most of the time, only a single UE will use the grant. It may be desired to increase the grant size of $CG_B$ depending, for example, on the number of UEs to be served.

Before transmission of $CG_B$, each UE that will use the grant may send the network an indication of the amount of data (e.g., the exact amount of data) that the UE will send on the pre-allocated time/frequency resources of $CG_B$ (e.g., the number of bytes currently available, allotted, or selected for transmission in the respective logical channel (LCH) or transmission buffer). As described above with reference to FIG. 15, the UE may send this indication in, for example, a special MAC CE (e.g., in $CG_A$), BSR type (e.g., in $CG_A$), or UCI (e.g., in $CG_A$ or on PUCCH). For simplicity, this instance is designated herein as "$CG_A$" (even though, as described above, it may be on a DG, on another CG, or in UCI). As a result of this indication, the network may know which part of the spectrum the UE will use. As the indication (e.g., the MAC CE or BSR or UCI) comes in advance of $CG_B$, the network may still assign the remaining grant to a different UE. While a higher efficiency may be realized if the different UE uses the same $CG_B$ allocation, it may be desired not to impose a restriction as to which UE the remaining grant may be allocated.

For a case in which the UE does not use the whole grant in $CG_B$, it may be desired that the UE does not include padding in $CG_B$ (e.g., for the rest of the huge pre-allocated grant). For example, it may be desired for the MAC PDU for $CG_B$ not to require the UE to include padding for up to the maximum amount of data in the $CG_B$. Instead, it may be desired for the TB size of $CG_B$ to be variable according to, for example, an indication given in $CG_A$. For example, the MAC CE (or BSR or UCI or L1 signal) may indicate a TB size (e.g., may include a TB size parameter), and the UE may shorten the TB based on the size indicated (e.g., in the MAC CE or BSR or UCI or L1 signal).

A UE may use the full grant only if it transmits the full amount of data (e.g., the maximum TBS for the grant). It may be desired to assign a different seed to each of the multiple UEs sharing the $CG_B$ so that, for example, the consumption by each of these UEs of the overall resource allocation of $CG_B$ may start with different Resource Blocks (and/or time domain resources and/or symbols). Alternatively, each UE may randomly select a different frequency/time resource as a starting point within the grant (e.g., for the resources in $CG_B$).

In a further alternative, it may be desired to configure the $CG_B$ so that overlapping CG resources (within $CG_B$) are not allocated to multiple users with high buffer states. However, such a configuration may not be sufficient if data is very bursty (e.g., because a buffer may be emptied and then re-filled again very quickly).

Figure 16:
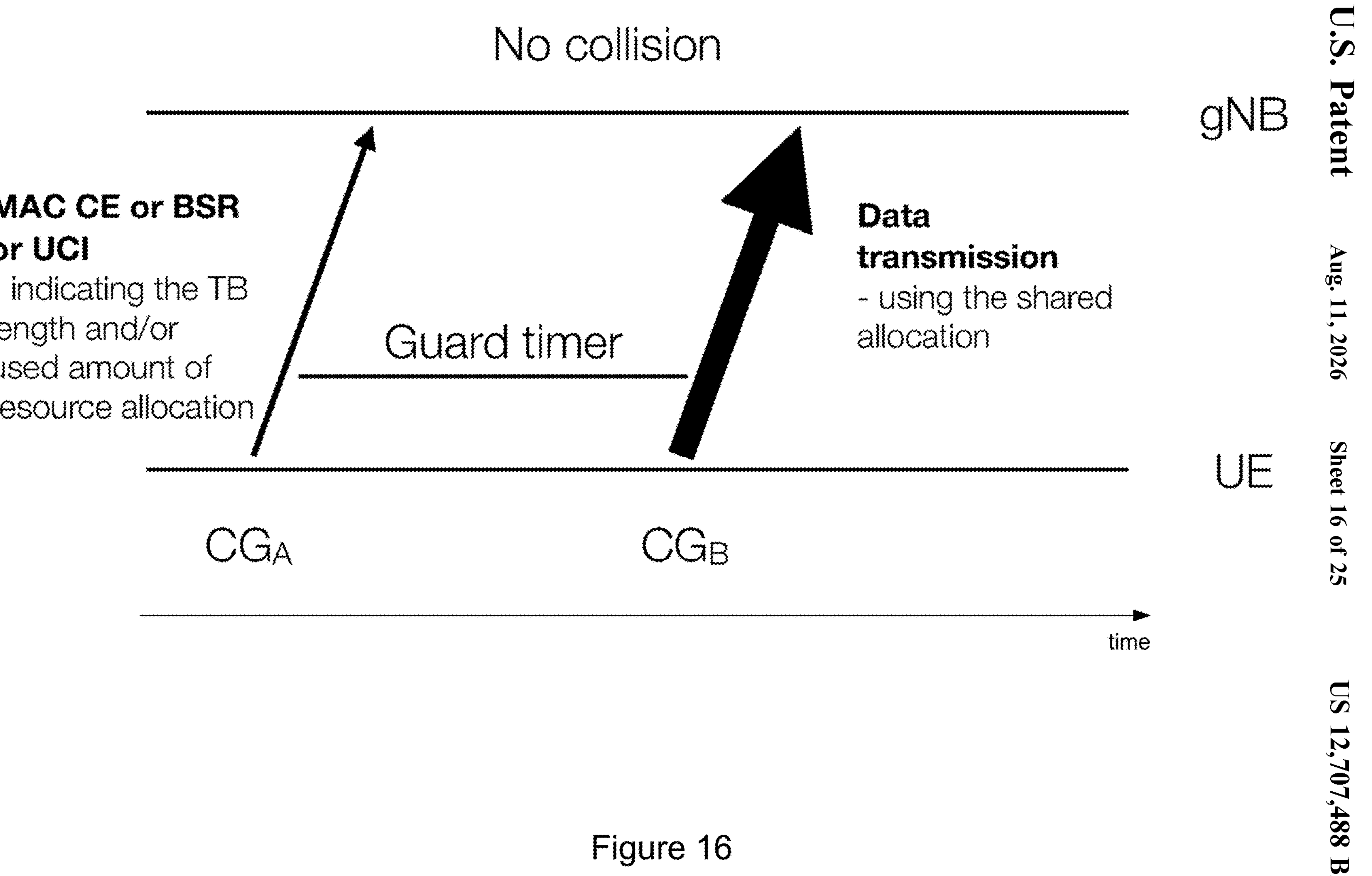
FIG. 16 shows an example in which an allocation is shared among multiple users with variable TB size in accordance with some embodiments.

FIG. 16 shows an example in which an allocation is shared among multiple users with variable TB size. As discussed above with reference to FIG. 15, it may be desired for the network to schedule $CG_A$ and $CG_B$ in close proximity. In a first part, a UE transmits in $CG_A$ a MAC CE or BSR (or alternatively a UCI or L1 signal) as described above that indicates how much of the grant allocation of $CG_B$ the UE will use. For example, the MAC CE (or BSR or UCI or L1 signal) may indicate the size of the MAC PDU that the UE will send on $CG_B$. The MAC CE (or BSR or UCI or L1 signal) may optionally also indicate the time/frequency resources to be used, although such information may not be required if the network can deduce it from the UE's identity (for example, each of the multiple UEs may be mapped to different pre-allocated resources).

As shown in FIG. 16, a guard interval may be provided for collision detection. For example, the UE may start a guard timer upon sending the notification of grant use of the next $CG_B$ in $CG_A$. Upon expiration of the guard timer, the UE may assume an ACK for $CG_A$ and may start transmitting on $CG_B$ (e.g., using the number of bytes, TB size, and/or subset of resource allocation as indicated in the MAC CE or BSR or UCI or L1 signal as described above). Alternatively, an explicit HARQ ACK may be implemented. If the network sends a NACK on the DCI in response to a $CG_A$ (e.g., using the CS-RNTI or a retransmission grant), then it may be desired for the UE to retransmit the $CG_A$. Such retransmission may occur, for example, on a DG.

A collision may occur if two or more UEs send $CG_A$ at the same time (see FIG. 17). If the network detects a collision among two or more UEs (e.g., the network receives $CG_A$ from multiple UEs), the gNB may send a DCI (e.g., using CS-RNTI) to one or more of the colliding UEs (or an L1 signal) which includes one of the following options: i) cancel the $CG_B$ instance altogether; or ii) cancel the $CG_B$ instance but allocate a DG to the UE for the data transmission; or iii) modify $CG_B$ for the UE so that the UE uses a different part of the $CG_B$ resource allocation for the data transmission (e.g., a different starting point within the time/frequency resources of $CG_B$).

Figure 18:
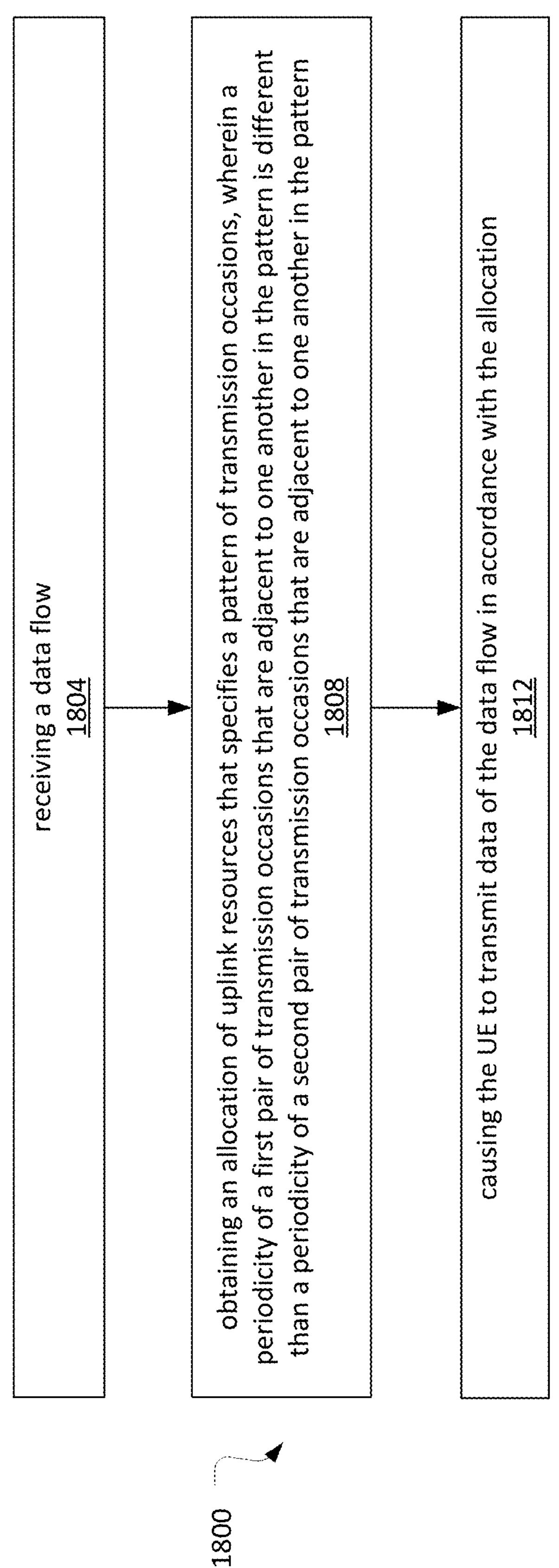
FIG. 18 illustrates an operational flow/algorithmic structure in accordance with some embodiments.

FIG. 18 illustrates an operation flow/algorithmic structure 1800 in accordance with some embodiments. The operation flow/algorithmic structure 1800 may be performed or implemented by a UE such as, for example, UE 104 or UE 2400; or components thereof, for example, baseband processor 2404A.

The operation flow/algorithmic structure 1800 may include, at 1804, receiving a data flow. The data flow may be any suitable data flow and/or may be produced by any suitable application. In a particular example, the data flow may be a flow of extended reality traffic.

The operation flow/algorithmic structure 1800 may include, at 1808, obtaining (e.g., from a network) an allocation of uplink resources that specifies a pattern of transmission occasions. The allocation may be a configured grant configuration. For example, the allocation may include a configured grant configuration (ConfiguredGrantConfig) information element.

The allocation may indicate a base periodicity of the pattern of transmission occasions. The allocation may indicate that a periodicity of a first pair of transmission occasions that are adjacent to one another in the pattern is different than a periodicity of a second pair of transmission occasions that are adjacent to one another in the pattern. The periodicity of the first pair of transmission occasions and the periodicity of the second pair of transmission occasions may be based on, for example, a distribution function, a table, and/or a sequence of periodicities, any of which may be indicated by the allocation.

The pattern of transmission occasions may include a plurality of subgroups of potential transmission occasions. In such case, the allocation may indicate a first periodicity of the potential transmission occasions within a first one of the plurality of subgroups, and the allocation may also indicate an inter-subgroup periodicity of the plurality of subgroups.

The operation flow/algorithmic structure 1800 may include, at 1812, causing the UE to transmit data of the data flow in accordance with the allocation.

Figure 19:
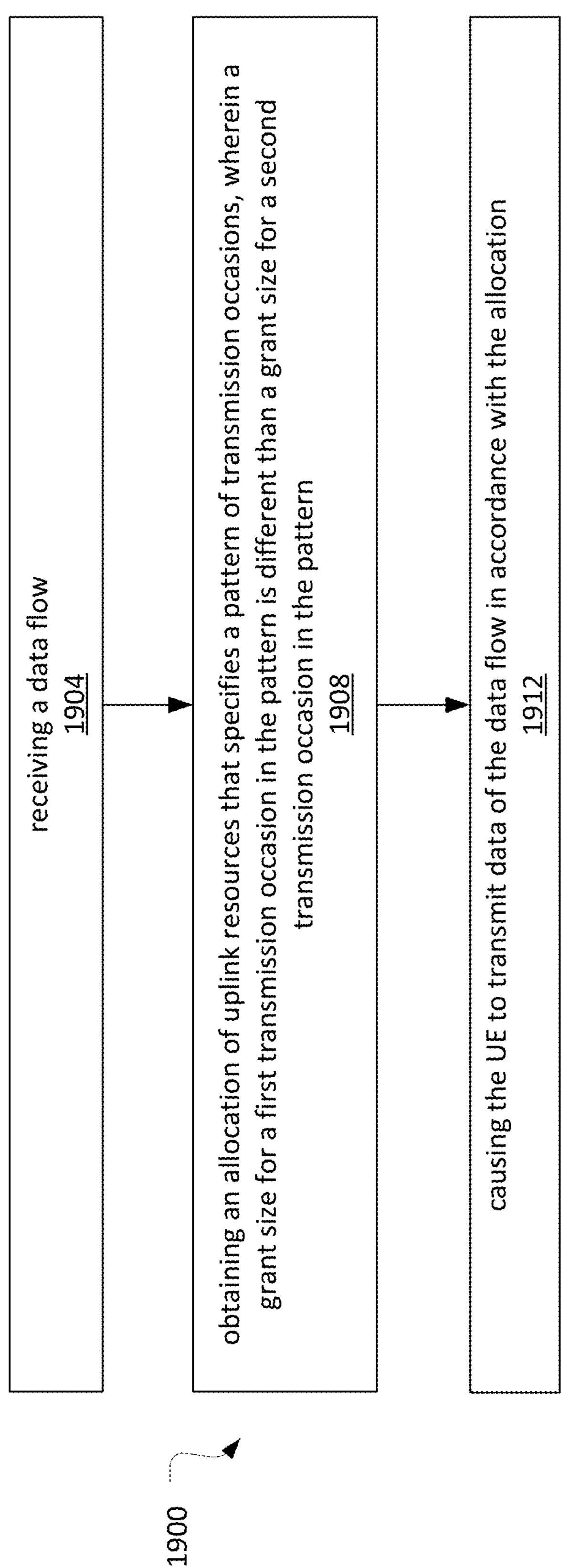
FIG. 19 illustrates an operational flow/algorithmic structure in accordance with some embodiments.

FIG. 19 illustrates an operation flow/algorithmic structure 1900 in accordance with some embodiments. The operation flow/algorithmic structure 1900 may be performed or implemented by a UE such as, for example, UE 104 or UE 2400; or components thereof, for example, baseband processor 2404A.

The operation flow/algorithmic structure 1900 may include, at 1904, receiving a data flow. The data flow may be any suitable data flow and/or may be produced by any suitable application. In a particular example, the data flow may be a flow of extended reality traffic.

The operation flow/algorithmic structure 1900 may include, at 1908, obtaining (e.g., from a network) an allocation of uplink resources that specifies a pattern of transmission occasions. The allocation may indicate that a grant size for a first transmission occasion in the pattern is different than a grant size for a second transmission occasion in the pattern. The grant size for each of the transmission occasions in the pattern may be based on a distribution function and/or a table, either of which may be indicated by the allocation.

The operation flow/algorithmic structure 1900 may include, at 1912, causing the UE to transmit data of the data flow in accordance with the allocation.

Figure 20:
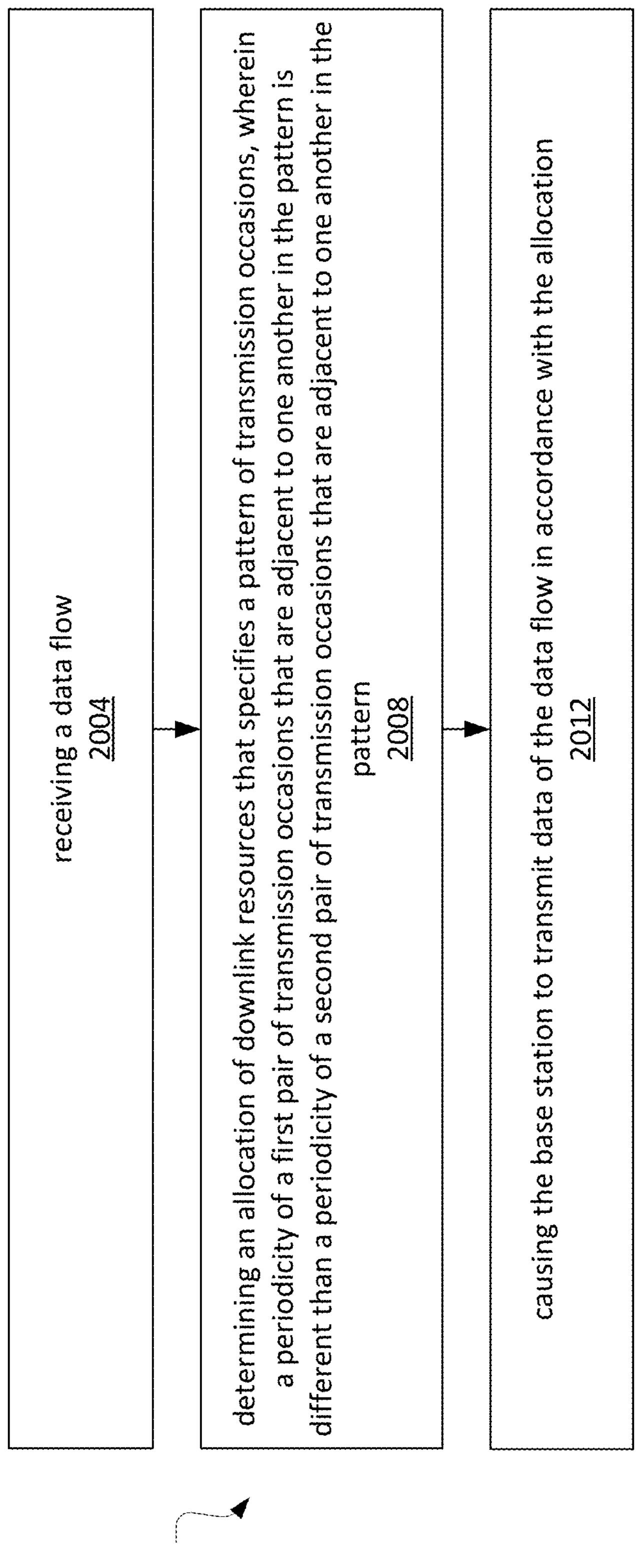
FIG. 20 illustrates an operational flow/algorithmic structure in accordance with some embodiments.

FIG. 20 illustrates an operation flow/algorithmic structure 2000 in accordance with some embodiments. The operation flow/algorithmic structure 2000 may be performed or implemented by a base station such as, for example, base station 108 or 2500; or components thereof, for example, baseband processor 2504A.

The operation flow/algorithmic structure 2000 may include, at 2004, receiving a data flow. The data flow may be any suitable data flow and/or may be produced by any suitable application. In a particular example, the data flow may be a flow of extended reality traffic.

The operation flow/algorithmic structure 2000 may include, at 2008, determining an allocation of downlink resources that specifies a pattern of transmission occasions. The allocation may be a semi-persistent scheduling configuration. For example, the allocation may include a semi-persistent scheduling configuration (SPS-Config) information element.

The allocation may indicate a base periodicity of the pattern of transmission occasions. The allocation may indicate that a periodicity of a first pair of transmission occasions that are adjacent to one another in the pattern may be different than a periodicity of a second pair of transmission occasions that are adjacent to one another in the pattern. The periodicity of the first pair of transmission occasions and the periodicity of the second pair of transmission occasions may be based on, for example, a distribution function, a table, and/or a sequence of periodicities, any of which may be indicated by the allocation.

The pattern of transmission occasions may include a plurality of subgroups of potential transmission occasions. In such case, the allocation may indicate a first periodicity of the potential transmission occasions within a first one of the plurality of subgroups, and the allocation may also indicate an inter-subgroup periodicity of the plurality of subgroups.

The operation flow/algorithmic structure 2000 may include, at 2012, causing the base station to transmit (e.g., to a UE) data of the data flow in accordance with the allocation. The operation flow/algorithmic structure 2000 may also include causing the base station to send (e.g., to a UE) a message describing the allocation.

Figure 21:
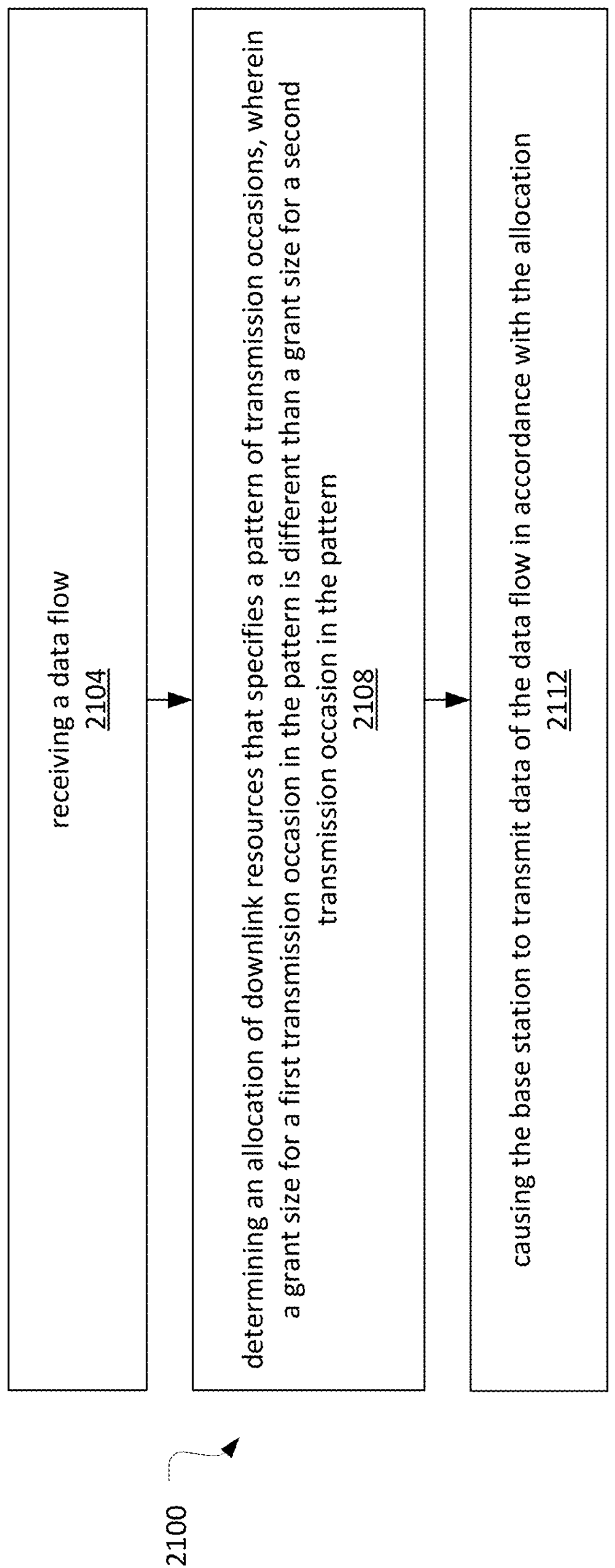
FIG. 21 illustrates an operational flow/algorithmic structure in accordance with some embodiments.

FIG. 21 illustrates an operation flow/algorithmic structure 2100 in accordance with some embodiments. The operation flow/algorithmic structure 2100 may be performed or implemented by a base station such as, for example, base station 108 or 2500; or components thereof, for example, baseband processor 2504A.

The operation flow/algorithmic structure 2100 may include, at 2104, receiving a data flow. The data flow may be any suitable data flow and/or may be produced by any suitable application. In a particular example, the data flow may be a flow of extended reality traffic.

The operation flow/algorithmic structure 2100 may include, at 2108, determining an allocation of downlink resources that specifies a pattern of transmission occasions. The allocation may indicate that a grant size for a first transmission occasion in the pattern is different than a grant size for a second transmission occasion in the pattern. The grant size for each of the transmission occasions in the pattern may be based on a distribution function and/or a table, either of which may be indicated by the allocation.

The operation flow/algorithmic structure 2100 may include, at 2112, causing the base station to transmit (e.g., to a UE) data of the data flow in accordance with the allocation.

Figure 22:
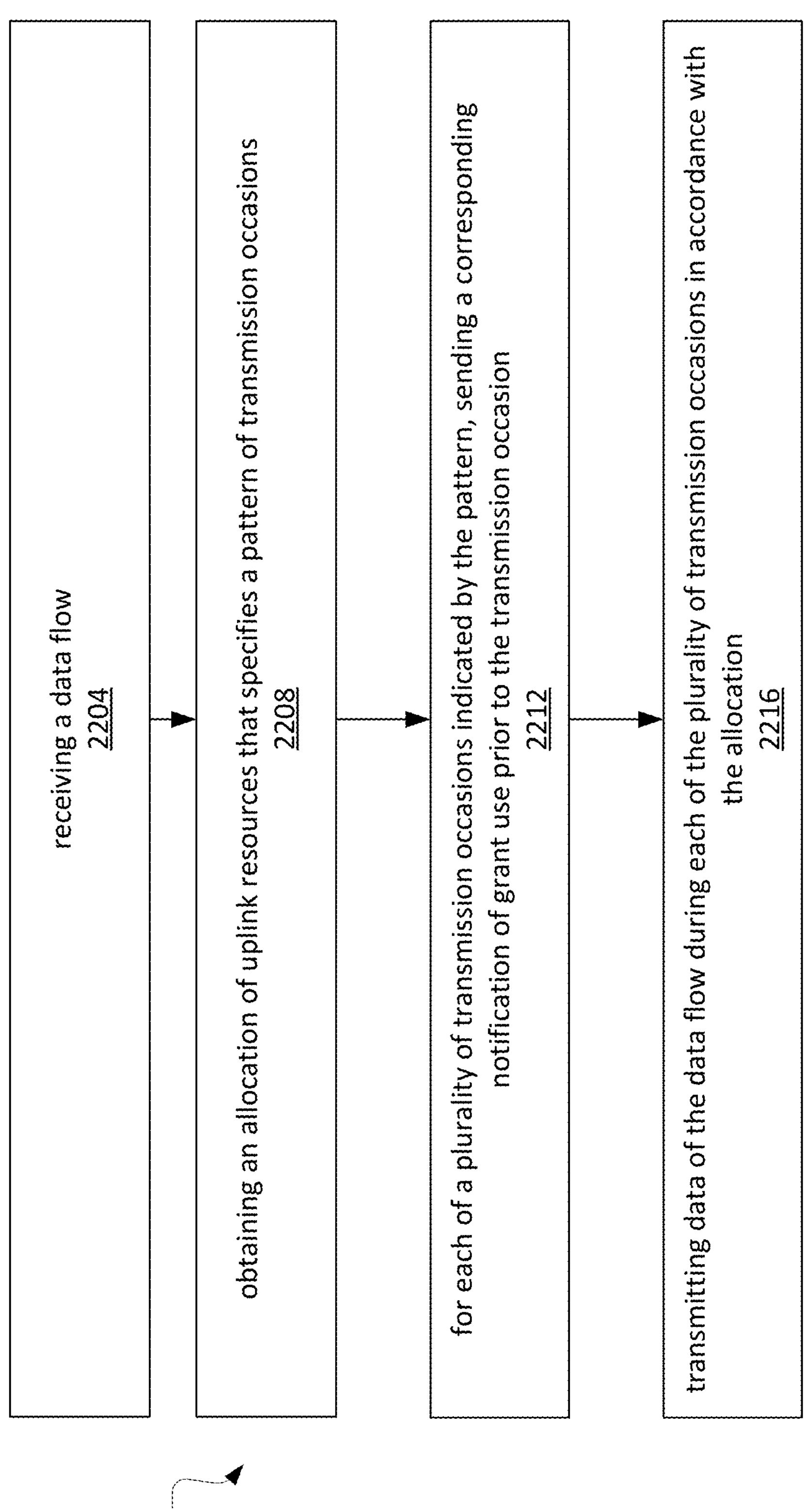
FIG. 22 illustrates an operational flow/algorithmic structure in accordance with some embodiments.

FIG. 22 illustrates an operation flow/algorithmic structure 2200 in accordance with some embodiments. The operation flow/algorithmic structure 2200 may be performed or implemented by a UE such as, for example, UE 104 or UE 2400; or components thereof, for example, baseband processor 2404A.

The operation flow/algorithmic structure 2200 may include, at 2204, receiving a data flow. The data flow may be any suitable data flow and/or may be produced by any suitable application. In a particular example, the data flow may be a flow of extended reality traffic.

The operation flow/algorithmic structure 2200 may include, at 2208, obtaining (e.g., from a network) an allocation of uplink resources that specifies a pattern of transmission occasions.

The operation flow/algorithmic structure 2200 may include, at 2212, for each of a plurality of transmission occasions indicated by the pattern, sending a corresponding notification of grant use prior to the transmission occasion. The notification may indicate how much of a grant allocation for the transmission occasion the UE will use. Alternatively, the operation flow/algorithmic structure 2200 may also include sending an indication of how much of a grant allocation for the transmission occasion the UE will use. For each of the plurality of transmission occasions, a time interval between the corresponding notification of grant use and the transmission occasion may be not less than a predetermined guard interval.

The operation flow/algorithmic structure 2200 may include, at 2216, transmitting data of the data flow during each of the plurality of transmission occasions in accordance with the allocation.

Figure 23:
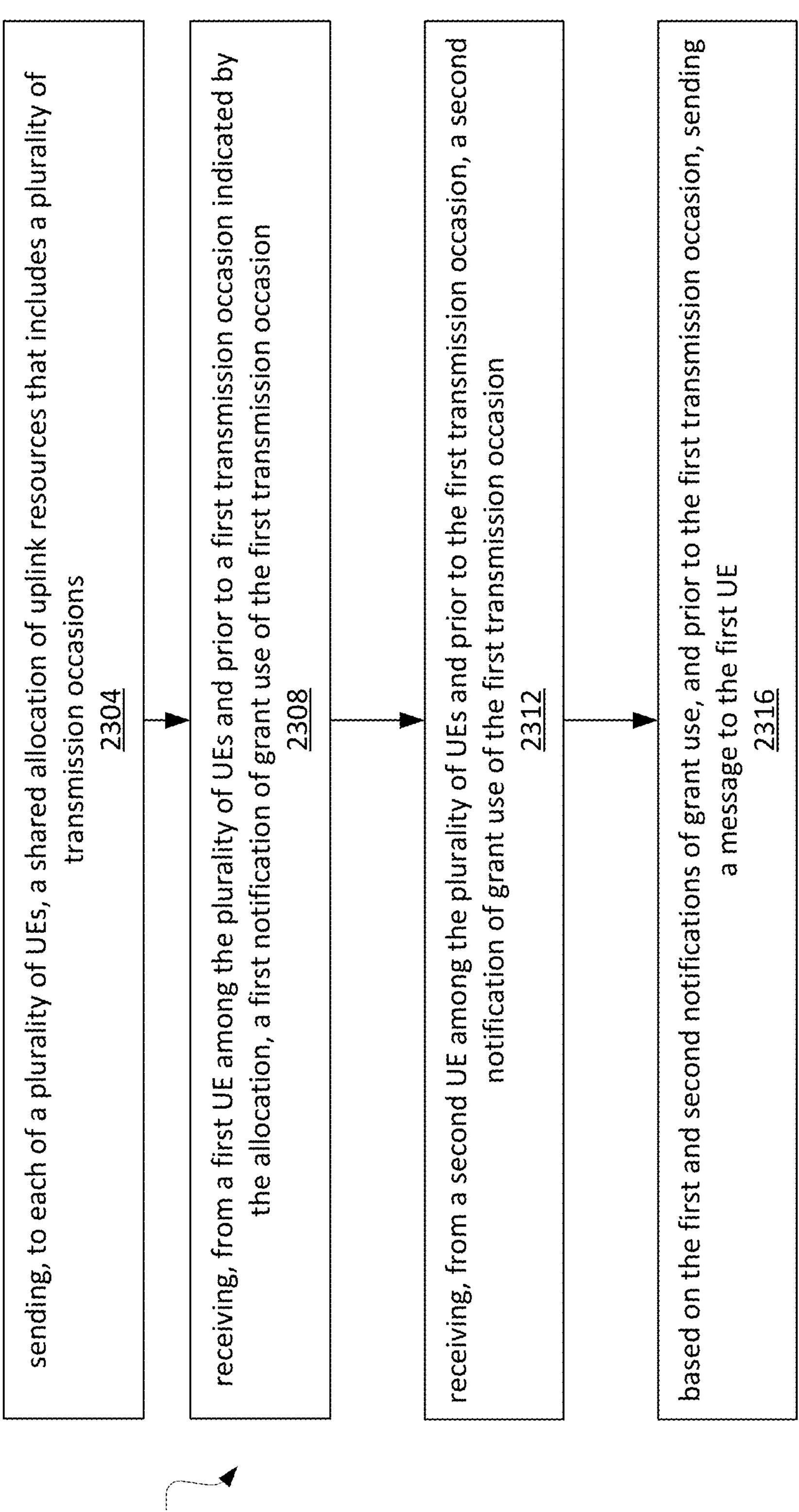
FIG. 23 illustrates an operational flow/algorithmic structure in accordance with some embodiments.

FIG. 23 illustrates an operation flow/algorithmic structure 2300 in accordance with some embodiments. The operation flow/algorithmic structure 2300 may be performed or implemented by a base station such as, for example, base station 108 or 2500; or components thereof, for example, baseband processor 2504A.

The operation flow/algorithmic structure 2300 may include, at 2304, sending, to each of a plurality of user equipments (UEs), a shared allocation of uplink resources that includes a plurality of transmission occasions.

The operation flow/algorithmic structure 2300 may include, at 2308, receiving, from a first UE among the plurality of UEs and prior to a first transmission occasion indicated by the allocation, a first notification of grant use of the first transmission occasion.

The operation flow/algorithmic structure 2300 may include, at 2312, receiving, from a second UE among the plurality of UEs and prior to the first transmission occasion, a second notification of grant use of the first transmission occasion.

The operation flow/algorithmic structure 2300 may include, at 2316, based on the first and second notifications of grant use, and prior to the first transmission occasion, sending a message to the first UE. For example, the message may be a DCI message. The message may allocate a dynamic grant to the first UE. Alternatively, the message may indicates a modification of the shared allocation.

Figure 24:
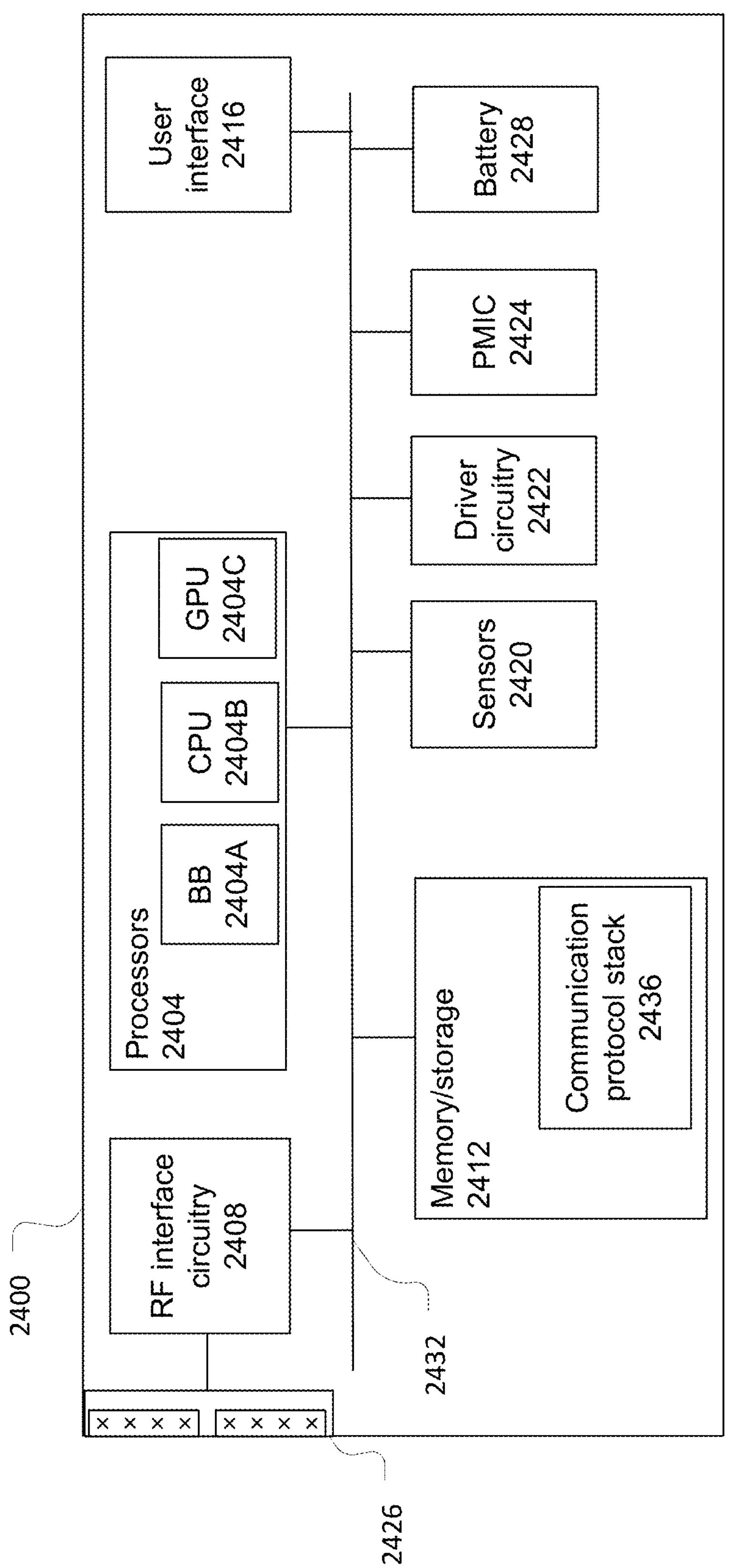
FIG. 24 illustrates a user equipment in accordance with some embodiments.

FIG. 24 illustrates a UE 2400 in accordance with some embodiments. The UE 2400 may be similar to and substantially interchangeable with UE 104 of FIG. 1.

The UE 2400 may be any mobile or non-mobile computing device, such as, for example, mobile phones, computers, tablets, glasses, XR devices, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 2400 may include processors 2404, RF interface circuitry 2408, memory/storage 2412, user interface 2416, sensors 2420, driver circuitry 2422, power management integrated circuit (PMIC) 2424, antenna structure 2426, and battery 2428. The components of the UE 2400 may be implemented as integrated circuits (ICs), portions thereof, discrete electronic devices, or other modules, logic, hardware, software, firmware, or a combination thereof. The block diagram of FIG. 24 is intended to show a high-level view of some of the components of the UE 2400. However, some of the components shown may be omitted, additional components may be present, and different arrangement of the components shown may occur in other implementations.

The components of the UE 2400 may be coupled with various other components over one or more interconnects 2432, which may represent any type of interface, input/output, bus (local, system, or expansion), transmission line, trace, optical connection, etc. that allows various circuit components (on common or different chips or chipsets) to interact with one another.

The processors 2404 may include processor circuitry such as, for example, baseband processor circuitry (BB) 2404A, central processor unit circuitry (CPU) 2404B, and graphics processor unit circuitry (GPU) 2404C. The processors 2404 may include any type of circuitry or processor circuitry that executes or otherwise operates computer-executable instructions, such as program code, software modules, or functional processes from memory/storage 2412 to cause the UE 2400 to perform operations as described herein.

In some embodiments, the baseband processor circuitry 2404A may access a communication protocol stack 2436 in the memory/storage 2412 to communicate over a 3GPP compatible network. In general, the baseband processor circuitry 2404A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 2408.

The baseband processor circuitry 2404A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 2412 may include one or more non-transitory, computer-readable media that includes instructions (for example, communication protocol stack 2436) that may be executed by one or more of the processors 2404 to cause the UE 2400 to perform various operations described herein. The memory/storage 2412 include any type of volatile or non-volatile memory that may be distributed throughout the UE 2400. In some embodiments, some of the memory/storage 2412 may be located on the processors 2404 themselves (for example, L1 and L2 cache), while other memory/storage 2412 is external to the processors 2404 but accessible thereto via a memory interface. The memory/storage 2412 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 2408 may include transceiver circuitry and radio frequency front module (RFEM) that allows the UE 2400 to communicate with other devices over a radio access network. The RF interface circuitry 2408 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 2426 and proceed to filter and amplify (with a low-noise amplifier) the signal. The signal may be provided to a receiver of the transceiver that down-converts the RF signal into a baseband signal that is provided to the baseband processor of the processors 2404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2426.

In various embodiments, the RF interface circuitry 2408 may be configured to transmit/receive signals in a manner compatible with NR access technologies.

The antenna 2426 may include antenna elements to convert electrical signals into radio waves to travel through the air and to convert received radio waves into electrical signals. The antenna elements may be arranged into one or more antenna panels. The antenna 2426 may have antenna panels that are omnidirectional, directional, or a combination thereof to enable beamforming and multiple input, multiple output communications. The antenna 2426 may include microstrip antennas, printed antennas fabricated on the surface of one or more printed circuit boards, patch antennas, phased array antennas, etc. The antenna 2426 may have one or more panels designed for specific frequency bands including bands in FR1 or FR2.

The user interface circuitry 2416 includes various input/output (I/O) devices designed to enable user interaction with the UE 2400. The user interface 2416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 2400.

The sensors 2420 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2422 may include software and hardware elements that operate to control particular devices that are embedded in the UE 2400, attached to the UE 2400, or otherwise communicatively coupled with the UE 2400. The driver circuitry 2422 may include individual drivers allowing other components to interact with or control various input/output (I/O) devices that may be present within, or connected to, the UE 2400. For example, driver circuitry 2422 may include a display driver to control and allow access to a display device, a touchscreen driver to control and allow access to a touchscreen interface, sensor drivers to obtain sensor readings of sensor circuitry 2420 and control and allow access to sensor circuitry 2420, drivers to obtain actuator positions of electro-mechanic components or control and allow access to the electro-mechanic components, a camera driver to control and allow access to an embedded image capture device, audio drivers to control and allow access to one or more audio devices.

The PMIC 2424 may manage power provided to various components of the UE 2400. In particular, with respect to the processors 2404, the PMIC 2424 may control power-source selection, voltage scaling, battery charging, or DC-to-DC conversion.

In some embodiments, the PMIC 2424 may control, or otherwise be part of, various power saving mechanisms of the UE 2400 including DRX as discussed herein.

A battery 2428 may power the UE 2400, although in some examples the UE 2400 may be mounted deployed in a fixed location, and may have a power supply coupled to an electrical grid. The battery 2428 may be a lithium ion battery, a metal-air battery, such as a zinc-air battery, an aluminum-air battery, a lithium-air battery, and the like. In some implementations, such as in vehicle-based applications, the battery 2428 may be a typical lead-acid automotive battery.

Figure 25:
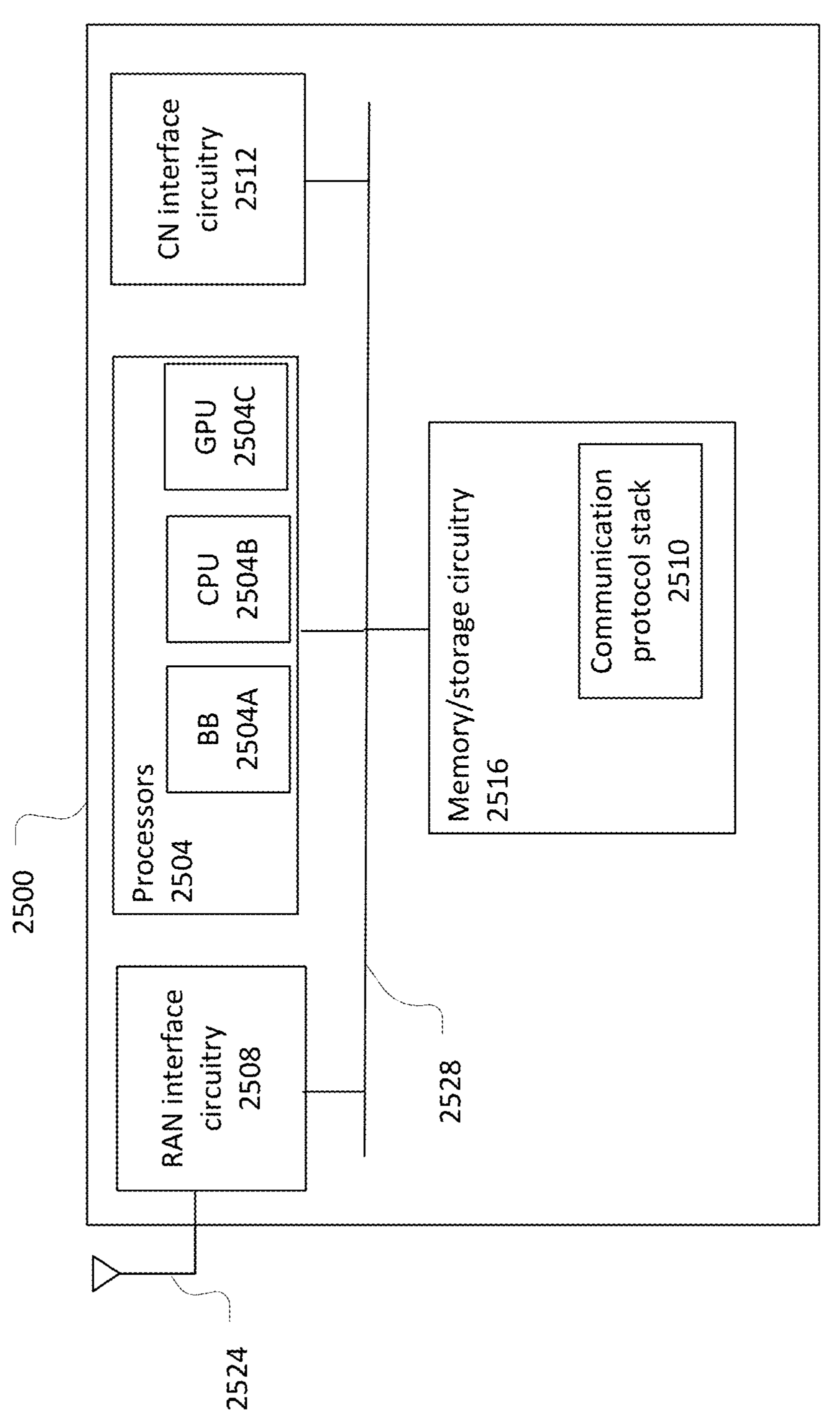
FIG. 25 illustrates a base station in accordance with some embodiments.

FIG. 25 illustrates an access node 2500 (e.g., a base station, such as an eNB or gNB) in accordance with some embodiments. The access node 2500 may be similar to and substantially interchangeable with base station 108.

The access node 2500 may include processors 2504, RF interface circuitry 2508, core network (CN) interface circuitry 2512, memory/storage circuitry 2516, and antenna structure 2526.

The components of the access node 2500 may be coupled with various other components over one or more interconnects 2528.

The processors 2504, RF interface circuitry 2508, memory/storage circuitry 2516 (including communication protocol stack 2510), antenna structure 2526, and interconnects 2528 may be similar to like-named elements shown and described with respect to FIG. 24.

The CN interface circuitry 2512 may provide connectivity to a core network, for example, a $5^{th}$ Generation Core network (5GC) (using a 5GC-compatible network interface protocol such as carrier Ethernet protocols, or some other suitable protocol) or a 4th Generation Core network (evolved packet core or "EPC"; for example, in an E-UTRAN NR—Dual Connectivity (EN-DC) deployment). Network connectivity may be provided to/from the access node 2500 via a fiber optic or wireless backhaul. The CN interface circuitry 2512 may include one or more dedicated processors or FPGAs to communicate using one or more of the aforementioned protocols. In some implementations, the CN interface circuitry 2512 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising receiving a data flow; obtaining an allocation of uplink resources that specifies a pattern of transmission occasions; and causing the UE to transmit data of the data flow in accordance with the allocation, wherein the allocation indicates: a periodicity of a first pair of transmission occasions adjacent to one another in the pattern that is different than a periodicity of a second pair of transmission occasions adjacent to one another in the pattern, or a grant size for a first transmission occasion in the pattern that is different than a grant size for a second transmission occasion in the pattern.

Example 2 includes the method of Example 1 or some other example herein, wherein the pattern of transmission occasions includes a plurality of subgroups of potential transmission occasions, the allocation indicates a first periodicity of the potential transmission occasions within a first one of the plurality of subgroups, and the allocation indicates an inter-subgroup periodicity of the plurality of subgroups.

Example 3 includes the method of Example 1 or some other example herein, wherein the allocation indicates a base periodicity of the pattern of transmission occasions.

Example 4 includes the method of Example 1 or some other example herein, wherein the allocation is a configured grant configuration.

Example 5 includes the method of Example 1 or some other example herein, wherein the allocation includes a configured grant configuration (ConfiguredGrantConfig) information element.

Example 6 includes the method of Example 1 or some other example herein, wherein the allocation indicates a periodicity of a first pair of transmission occasions adjacent to one another in the pattern that is different than a periodicity of a second pair of transmission occasions adjacent to one another in the pattern.

Example 7 includes the method of Example 6 or some other example herein, wherein the periodicity of the first pair of transmission occasions and the periodicity of the second pair of transmission occasions are based on a distribution function that is indicated by the allocation.

Example 8 includes the method of Example 6 or some other example herein, wherein the periodicity of the first pair of transmission occasions and the periodicity of the second pair of transmission occasions are based on a table that is indicated by the allocation.

Example 9 includes the method of Example 6 or some other example herein, wherein the periodicity of the first pair of transmission occasions and the periodicity of the second pair of transmission occasions are based on a sequence of periodicities that is indicated by the allocation.

Example 10 includes the method of Example 1 or some other example herein, wherein the allocation indicates a grant size for a first transmission occasion in the pattern that is different than a grant size for a second transmission occasion in the pattern.

Example 11 includes the method of Example 10 or some other example herein, wherein a grant size for each of the transmission occasions in the pattern is based on a distribution function that is indicated by the allocation.

Example 12 includes the method of Example 10 or some other example herein, wherein a grant size for each of the transmission occasions in the pattern is based on a table that is indicated by the allocation.

Example 13 includes a method of operating a base station, the method comprising determining an allocation of downlink resources that specifies a pattern of transmission occasions; and causing the base station to transmit data of a data flow in accordance with the allocation, wherein the allocation indicates: a periodicity of a first pair of transmission occasions adjacent to one another in the pattern that is different than a periodicity of a second pair of transmission occasions adjacent to one another in the pattern, or a grant size for a first transmission occasion in the pattern that is different than a grant size for a second transmission occasion in the pattern.

Example 14 includes the method of Example 13 or some other example herein, further comprising causing the base station to send a message describing the allocation.

Example 15 includes the method of Example 13 or some other example herein, wherein the pattern of transmission occasions includes a plurality of subgroups of potential transmission occasions, the allocation indicates a first periodicity of the potential transmission occasions within a first one of the plurality of subgroups, and the allocation indicates an inter-subgroup periodicity of the plurality of subgroups.

Example 16 includes the method of Example 13 or some other example herein, wherein the allocation indicates a base periodicity of the pattern of transmission occasions.

Example 17 includes the method of Example 13 or some other example herein, wherein the allocation is a semi-persistent scheduling configuration.

Example 18 includes the method of Example 13 or some other example herein, wherein the allocation includes a semi-persistent scheduling configuration (SPS-Config) information element.

Example 19 includes the method of Example 13 or some other example herein, wherein the allocation indicates a periodicity of a first pair of transmission occasions adjacent to one another in the pattern that is different than a periodicity of a second pair of transmission occasions adjacent to one another in the pattern.

Example 20 includes the method of Example 13 or some other example herein, wherein the allocation indicates a grant size for a first transmission occasion in the pattern that is different than a grant size for a second transmission occasion in the pattern.

Example 21 includes a method of operating a UE, the method comprising: receiving a data flow; obtaining an allocation of uplink resources that specifies a pattern of transmission occasions; and causing the UE to transmit data of the data flow during each of a plurality of transmission occasions in accordance with the allocation, wherein the method includes causing the UE to send, for each of the plurality of transmission occasions, a corresponding notification of grant use prior to the transmission occasion.

Example 22 includes the method of Example 21 or some other example herein, wherein the method comprises causing the UE to send, for each of the plurality of transmission occasions, a corresponding indication of how much of a grant allocation for the transmission occasion the UE will use.

Example 23 includes the method of Example 21 or some other example herein, wherein, for each of the plurality of transmission occasions, a time interval between the corresponding notification of grant use and the transmission occasion is not less than a predetermined guard interval.

Example 24 includes a method of operating a base station, the method comprising: sending, to each of a plurality of UEs, a shared allocation of uplink resources that includes a plurality of transmission occasions; receiving, from a first UE among the plurality of UEs and prior to a first transmission occasion indicated by the allocation, a first notification of grant use of the first transmission occasion; receiving, from a second UE among the plurality of UEs and prior to the first transmission occasion, a second notification of grant use of the first transmission occasion; and based on the first and second notifications of grant use, and prior to the first transmission occasion, sending a message to the first UE.

Example 25 includes the method of Example 24 or some other example herein, wherein the message is a DCI message.

Example 26 includes the method of Example 24 or some other example herein, wherein the message allocates a dynamic grant to the first UE.

Example 27 includes the method of Example 24 or some other example herein, wherein the message indicates a modification of the shared allocation.

Example 28 may include an apparatus comprising means to perform one or more elements of a method described in or related to any of examples 1-27, or any other method or process described herein.

Example 29 may include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example 30 may include an apparatus comprising logic, modules, or circuitry to perform one or more elements of a method described in or related to any of examples 1-27, or any other method or process described herein.

Example 31 may include a method, technique, or process as described in or related to any of examples 1-27, or portions or parts thereof.

Example 32 may include an apparatus comprising: one or more processors and one or more computer-readable media comprising instructions that, when executed by the one or more processors, cause the one or more processors to perform the method, techniques, or process as described in or related to any of examples 1-27, or portions thereof.

Example 33 may include a signal as described in or related to any of examples 1-27, or portions or parts thereof.

Example 34 may include a datagram, information element, packet, frame, segment, PDU, or message as described in or related to any of examples 1-27, or portions or parts thereof, or otherwise described in the present disclosure.

Example 35 may include a signal encoded with data as described in or related to any of examples 1-27, or portions or parts thereof, or otherwise described in the present disclosure.

Example 36 may include a signal encoded with a datagram, IE, packet, frame, segment, PDU, or message as described in or related to any of examples 1-27, or portions or parts thereof, or otherwise described in the present disclosure.

Example 37 may include an electromagnetic signal carrying computer-readable instructions, wherein execution of the computer-readable instructions by one or more processors is to cause the one or more processors to perform the method, techniques, or process as described in or related to any of examples 1-27, or portions thereof.

Example 38 may include a computer program comprising instructions, wherein execution of the program by a processing element is to cause the processing element to carry out the method, techniques, or process as described in or related to any of examples 1-27, or portions thereof.

Example 39 may include a signal in a wireless network as shown and described herein.

Example 40 may include a method of communicating in a wireless network as shown and described herein.

Example 41 may include a system for providing wireless communication as shown and described herein.

Example 42 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

receiving a data flow;

obtaining an allocation of uplink resources that specifies a pattern of transmission occasions; and at least one resource allocation parameter, wherein the at least one resource allocation parameter indicates a variation of grant sizes among the transmission occasions in the pattern such that a first grant size for a first transmission occasion in the pattern is different than a second grant size for a second transmission occasion in the pattern; and outputting, for transmission, data of the data flow according to the allocation.

2. The method of claim 1, wherein:

the pattern of transmission occasions includes a plurality of subgroups of potential transmission occasions, the allocation indicates a first periodicity of the potential transmission occasions within a first one of the plurality of subgroups, and the allocation indicates an inter-subgroup periodicity of the plurality of subgroups.

3. The method of claim 1, wherein the allocation indicates a base periodicity of the pattern of transmission occasions.

4. The method of claim 1, wherein the allocation is a configured grant configuration.

5. The method of claim 1, wherein the allocation includes a configured grant configuration (ConfiguredGrantConfig) information element.

6. The method of claim 1, wherein the allocation indicates a periodicity of a first pair of transmission occasions adjacent to one another in the pattern that is different than a periodicity of a second pair of transmission occasions adjacent to one another in the pattern.

7. The method of claim 6, wherein the periodicity of the first pair of transmission occasions and the periodicity of the second pair of transmission occasions are based on a distribution function that is indicated by the allocation, wherein the periodicity of the first pair of transmission occasions and the periodicity of the second pair of transmission occasions are based on:

a table that is indicated by the allocation, or a sequence of periodicities that is indicated by the allocation.

8. The method of claim 1, wherein the variation of grant sizes among the transmission occasions in the pattern is based on a variation of transport block sizes for transport blocks corresponding to the transmission occasions, and wherein each of the transport block sizes is based on a modulation and coding scheme, a number of resource elements associated with a transport block, a number of tables, or a number of Orthogonal Frequency-Division Multiple Access (OFDMA) symbols.

9. The method of claim 1, wherein the variation of grant sizes among the transmission occasions in the pattern is based on a distribution function that is indicated by the allocation, and wherein the distribution function is a Pareto distribution, a Poisson distribution, a Gaussian distribution, or a truncated Gaussian distribution.

10. An apparatus comprising:

interface circuitry; and processing circuitry coupled to the interface circuitry, the processing circuitry to:

obtain an allocation of uplink resources that specifies a pattern of transmission occasions and at least one resource allocation parameter, wherein the at least one resource allocation parameter indicates a variation of grant sizes among the transmission occasions in the pattern such that a first grant size for a first transmission occasion in the pattern that is different than a second grant size for a second transmission occasion in the pattern, wherein the variation of grant sizes among the transmission occasions is based on a variation of transport block sizes for transport blocks corresponding to the transmission occasions; and output, for transmission to a base station using the interface circuitry, data of a data flow according to the allocation.

11. The apparatus of claim 10, wherein the allocation indicates a periodicity of a first pair of transmission occasions adjacent to one another in the pattern that is different than a periodicity of a second pair of transmission occasions adjacent to one another in the pattern.

12. The apparatus of claim 10, wherein:

a grant size for each of the transmission occasions in the pattern is based on a distribution function that is indicated by the allocation, wherein the distribution function is a Pareto distribution, a Poisson distribution, a Gaussian distribution, or a truncated Gaussian distribution, or a grant size for each of the transmission occasions in the pattern is based on a table that is indicated by the allocation.

13. An apparatus comprising:

interface circuitry; and processing circuitry coupled to the interface circuitry, the processing circuitry to:

determine an allocation of downlink resources that specifies a pattern of transmission occasions; and at least one resource allocation parameter, wherein the at least one resource allocation parameter indicates a variation of grant sizes among the transmission occasions in the pattern such that a grant size for a first transmission occasion in the pattern that is different than a grant size for a second transmission occasion in the pattern; and output, for transmission to a user equipment (UE) using the interface circuitry, data of a data flow according to the allocation.

14. The apparatus of claim 13, wherein the processing circuitry is further to output, for transmission using the interface circuitry, a message describing the allocation.

15. The apparatus of claim 13, wherein:

the pattern of transmission occasions includes a plurality of subgroups of potential transmission occasions, the allocation indicates a first periodicity of the potential transmission occasions within a first one of the plurality of subgroups, and the allocation indicates an inter-subgroup periodicity of the plurality of subgroups.

16. The apparatus of claim 13, wherein the allocation indicates a base periodicity of the pattern of transmission occasions.

17. The apparatus of claim 13, wherein the allocation is a semi-persistent scheduling configuration.

18. The apparatus of claim 13, wherein the allocation includes a semi-persistent scheduling configuration (SPS-Config) information element.

19. The apparatus of claim 13, wherein the allocation indicates a periodicity of a first pair of transmission occasions adjacent to one another in the pattern that is different than a periodicity of a second pair of transmission occasions adjacent to one another in the pattern.

20. The apparatus of claim 13, wherein the variation of grant sizes among the transmission occasions in the pattern is based on a variation of transport block sizes for transport blocks corresponding to the transmission occasions, and wherein each of the transport block sizes is based on a modulation and coding scheme, a number of resource elements associated with a transport block, a number of tables, or a number of Orthogonal Frequency-Division Multiple Access (OFDMA) symbols.

* * * * *